US006256447B1

(12) United States Patent
Laine

(10) Patent No.: US 6,256,447 B1
(45) Date of Patent: *Jul. 3, 2001

(54) BACKLIGHT FOR CORRECTING DIAGONAL LINE DISTORTION

(75) Inventor: Jeffrey A. Laine, Redondo Beach, CA (US)

(73) Assignee: Physical Optics Corporation, Torrance, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,987

(22) Filed: Dec. 31, 1998

(51) Int. Cl.[7] .............................. G02B 6/10; G02B 6/00; F21V 7/04
(52) U.S. Cl. ........................... 385/146; 385/36; 385/147; 385/901; 362/559; 362/560; 362/561; 349/56; 349/57; 349/58; 349/64; 349/65; 349/67
(58) Field of Search ............................ 385/36, 129, 146, 385/147, 901; 359/443, 449; 362/559, 560, 561; 349/56, 57, 58, 64, 65, 67

(56) References Cited

U.S. PATENT DOCUMENTS

| 5,237,641 | * | 8/1993 | Jacobson et al. | 385/146 |
| 5,280,371 | | 1/1994 | McCartner, Jr. et al. | 359/40 |
| 5,359,691 | * | 10/1994 | Tai et al. | 385/146 |

(List continued on next page.)

FOREIGN PATENT DOCUMENTS

| 0 544 332 A1 | 6/1993 | (EP) | 385/146 X |
| 0 588 504 A1 | 3/1994 | (EP) | 385/146 X |
| 06174929 | 6/1994 | (JP) | 385/146 X |

OTHER PUBLICATIONS

PCT International Search Report, Application No. PCT/US99/31116 (Apr. 2000).
Jannson, Tomasz, "Radiance Transfer Function," *Journal of the Optical Society of America*, vol. 70, No. 12, Dec. 1980, pp. 1544–1549.
Jannson, T. and I. Tengara. "Radiometric Ray Tracing," *Proceedings of the 10th Symposium on Energy Engineering*, (Argonne National Laboratory, Argonne, IL, 1992), pp. 241–250.
Jannson, Tomasz, Tin Aye, and Indra Tengara. "Second-Order Radiometric Ray Tracing," *Journal of the Optical Society of America*, vol. 13, No. 7, Jul. 1996, pp. 1448–1455.
Jannson, T. and R. Winston. "Liouville's Theorem and Concentrator Optics," *Journal of the Optical Society of America*, vol. 3, No. 1, Jan. 1986, pp. 7–8.

*Primary Examiner*—Brian Healy
(74) *Attorney, Agent, or Firm*—Nilles & Nilles, S.C.

(57) ABSTRACT

A backlight apparatus has a collimating waveguide with a light input end, a top surface, a bottom surface, opposing sides, a far end opposite the light input end, and a total internal reflection critical angle for the material of the waveguide. A plurality of first facets are formed in the bottom surface distributed along the waveguide between the light input end and the far end. Each of the first facets has a first facet bottom surface which converges toward the top surface in a direction away from the far end relative to the top surface. A light scattering and reflective surface is disposed adjacent the far end of the collimating waveguide. The first facet bottom surfaces cause light rays entering the light input end to be totally internally reflected to the far end of the collimating waveguide wherein the scattering and reflective surface at the far end reflects and scatters light rays incident thereon back toward the light input end. The first facet bottom surfaces then cause the light rays reflected from the far end to exit the top surface. The first facet bottom surfaces may be formed either as straight facets or as curved surface facets and may also be alternatively formed having a reflective material layer thereon.

42 Claims, 13 Drawing Sheets

U.S. PATENT DOCUMENTS

| | | | |
|---|---|---|---|
| 5,390,276 | * | 2/1995 | Tai et al. ................................ 385/146 |
| 5,420,761 | | 5/1995 | DuNah et al. .......................... 362/31 |
| 5,481,385 | | 1/1996 | Zimmerman et al. ................. 359/40 |
| 5,485,291 | | 1/1996 | Qiao et al. .............................. 359/49 |
| 5,506,929 | * | 4/1996 | Tai et al. ................................ 385/146 |
| 5,594,830 | * | 1/1997 | Winston et al. ...................... 385/146 |
| 5,640,483 | * | 6/1997 | Lin ........................................ 385/146 |
| 5,710,856 | * | 1/1998 | Ishii et al. ............................. 385/146 |
| 5,735,988 | * | 4/1998 | Chau et al. ....................... 385/146 X |
| 5,838,403 | | 11/1998 | Jannson et al. ........................ 349/65 |
| 5,926,601 | * | 7/1999 | Tai et al. ............................... 385/146 |
| 5,985,240 | * | 11/1999 | Koike et al. ..................... 385/146 X |
| 6,044,196 | * | 3/2000 | Winston et al. ..................... 385/146 |

\* cited by examiner

BACKLIGHT FOR CORRECTING DIAGONAL LINE DISTORTION

BACKGROUND OF THE INVENTION

1. Field of the Invention

The present invention relates generally to a backlight such as is used in backlighting a flat panel liquid crystal display (LCD), and more particularly to a backlight having an optical input arranged to provide a uniform light distribution to the LCD.

2. Description of the Related Art

Flat panel displays, such as liquid crystal displays or LCD's used in laptop computers, generally incorporate a backlighting system to illuminate a liquid crystal based display panel. Important requirements of the backlighting system are to provide a substantially uniform light distribution and to provide a sufficiently intense light distribution over the entire plane of the display panel. To accomplish these requirements, the backlighting system typically incorporates a light pipe to couple light energy from a light source to the LCD panel. In scattering backlighting systems, an array of diffusing elements are disposed along one surface of the light pipe to scatter light rays incident thereto toward an output plane. The output plane is coupled to the LCD panel, coupling the light rays into and through the LCD panel. While a scattering backlighting system offers the ability, by controlling the distribution of the scattering media on the scattering surface, to control the light distribution, it does not offer an ability to control the angle of light distribution. Much of the light energy produced by the backlighting system is wasted because it is scattered in directions that are not useful to a viewer or user of the LCD display. Because much of the light energy is not directed to the user and thus wasted, scattering backlighting systems lack the desired light energy intensity or brightness.

Non-scattering backlighting systems offer the advantage that both the light distribution and the angle of distribution may be controlled. Thus, the light energy may be directed in a way to make more efficient use of the available light energy. For example, the light energy may be directed so that substantially all of the light energy is emitted toward the user. A term often used to describe non-scattering backlighting systems is "deterministic" because the output point of a light ray is known based upon its input position. Thus, it may be said that a non-scattering backlighting system correlates the rays of input light energy and the rays of output light energy.

This correlation is advantageously used in the design of a backlighting system to ensure that a majority of the light energy is directed to the user. The correlation of input light rays to output light rays in a non-scattering backlighting system may also lead to a potential disadvantage arising from imaging at the light input appearing at the light output. If there is any distortion of the light energy at the input, this distortion will also appear at the output. The distortion may result from roughness or discontinuity in the light source or the input optics. Generally, such distortions will result in an area of non-uniform light intensity or a shadow in the output. Another source of distortion is the construction of the walls of the light pipe perpendicular to the light source. These walls must be made extremely smooth and flat or else they result in a distortion or shadow in the output.

A particular distortion that is observed in non-scattering backlighting systems is the formation of a diagonal line across the output plane of the backlight. It has been observed that distortions at the corner or interface between each side wall of a light pipe and the input surface of the light pipe are imaged into the output as a dark, diagonal line. The distortions in each corner are due to manufacturing limitations in the construction of the light pipe. While it is possible to polish and smooth the surfaces to reduce the appearance of such a distortion, these processes are time consuming and labor intensive and, therefore, are impractical in mass production of light pipes.

Additionally, it has been observed that non-uniformity in the direct output of the light source may cause distortions and shadows in the output. More particularly, a cold cathode fluorescent light (CCFL), for example, has inherent dim regions adjacent the electrodes at each end of the CCFL tube. These dim regions are areas where the light output from the CCFL is not uniform, and the light output is substantially diminished as compared to a center portion of the tube. Not only do these dim areas image into the output plane, but they also contribute to and exacerbate the appearance of the diagonal line.

Other light sources may be utilized in an LCD light pipe such as light emitting diodes (LED's), incandescent bulbs, laser diodes, and virtually any other point light source. These light sources each typically exhibit some non-uniformity in the light output energy as well, creating a distortion problem in the LCD output.

Co-pending and commonly assigned U.S. patent application Ser. No. 09/137,549, pending, entitled "Light Pipe for a Backlighting System" discloses a light pipe construction which addresses the diagonal line problem. The disclosed light pipe includes extensions beyond the perimeter of the output surface dimensions for use with an oversized light source. The extensions and elongate bulb correct the diagonal line problem but disadvantageously increase the size of the light pipe.

SUMMARY OF THE INVENTION

What is needed is a light pipe or backlight apparatus for a backlighting system which eliminates distortions in the output of a liquid crystal display but does not require costly, time consuming and labor intensive efforts in producing the backlight. What is also needed is a light pipe wherein the light pipe and light source are conventional in size and do not require larger dimensions than are needed for the LCD display itself. One object of the present invention is to provide a backlight apparatus for an LCD that is of the same size and configuration of a conventional backlight and yet essentially eliminates the diagonal distortion problem. Another object of the present invention is to provide a backlight apparatus which requires virtually no additional manufacturing processes or efforts than a conventional backlight construction and yet eliminates the diagonal line distortion problem.

These and other objects and advantages are achieved by the particular backlight construction of the invention. In one embodiment, a backlight apparatus includes a collimating waveguide with a light input end, a top surface, a bottom surface, opposing sides, a far end opposite the light input end, and a total internal reflection critical angle for the material of the waveguide. The apparatus also has a plurality of first facets formed in the bottom surface distributed along the collimating waveguide between the light input end and the far end. The plurality of first facets extend at least partway between the opposing sides. Each of the first facets has a first facet bottom surface converging toward the top surface in a direction away from the far end at an angle relative to the top surface of less than about 10°. A light scattering reflective surface is disposed adjacent the far end of the collimating waveguide. The first facet bottom surfaces are arranged so that they cause light rays entering the light input end to be totally internally reflected to the far end of the collimating waveguide without being leaked from the top surface. The reflective surface at the far end reflects and scatters the light rays incident thereon back toward the light input end. The first facet bottom surfaces are arranged so that they cause light rays reflected from the far end and at an angle near the total internal reflection critical angle to exit the top surface of the waveguide. Such a construction is different than previous constructions in that all of the light entering the input end travels the entire length of the collimating waveguide prior to being leaked through the top surface that is adjacent a liquid crystal display.

In one embodiment of the invention, a liquid crystal display apparatus has a liquid crystal element with a front viewing surface and an opposite rear surface. A collimating waveguide has a light input end, a top surface facing the rear surface of the liquid crystal display, a bottom surface, opposing sides, a far end opposite the light input end, and a total internal reflection critical angle for the material of the waveguide. A light source is disposed adjacent the light input end. A plurality of first facets are formed in the bottom surface and distributed along the collimating waveguide between the light input end and the far end and extend at least partway between the opposing sides. Each of the first facets has a first facet bottom surface converging toward the top surface in a direction away from the far end at an angle relative to the top surface of less than about 10°. A light scattering reflective surface is disposed at the far end of the collimating waveguide. The first facet bottom surfaces are arranged to cause light rays entering the light input end to be totally internally reflected to the far end of the collimating waveguide. The reflective surface at the far end reflects and scatters light rays incident thereon back toward the light input end. The first facet bottom surfaces are arranged to cause light rays reflected from the far end to exit the top surface of the collimating waveguide toward the liquid crystal display element.

In one embodiment, the first facet bottom surfaces are straight facets generally parallel to one another. In another embodiment, the first facet bottom surfaces are curved or non-linear surfaces.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Overview of Backlight Apparatus

A backlight apparatus of the present invention transmits light along the entire length of the light pipe or waveguide from the light input end without any light emanating from the output surface. The light then is scattered and reflected by a scattering reflective surface at the far end of the light pipe or waveguide and returned toward the light source end. As the light reflecting from the far end travels back toward the light source, it is reflected by the bottom surface of the backlight toward the top emission or output surface. The light then exits the backlight apparatus toward a display or liquid crystal element. The backlight provides a substantially uniform light intensity distribution over the display surface of the LCD assembly. By utilizing the construction of the present invention, non-uniform or dim areas of the light source, such as at the electrode ends of a CCFL tube, are muted so that they do not produce a diagonal line or distortion in the display. Additionally, the light pipe of the present invention eliminates distortion in the display caused by a sharp corner construction at the edges of the mating surface between the light source and the light transmitting element or waveguide.

The present invention and the various features and advantageous details thereof are explained more fully with reference to the nonlimiting embodiments described in detail below.

Figure 1:
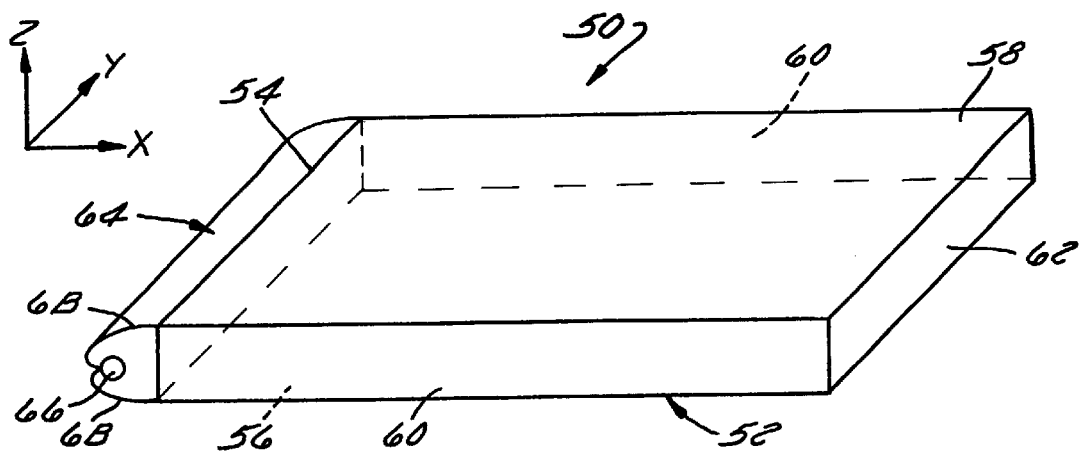
FIG. 1 illustrates a representation of a collimating waveguide according to the present invention.

Referring now to the drawings, FIG. 1 illustrates a backlight apparatus 50 having a generally planer collimating waveguide 52. The waveguide 52 has a light input end 54, a bottom surface 56, a top surface 58, opposing sides 60, and a far end 62 which is opposite the light input end. A light source assembly 64 is in optical communication with the light input end 54 and has an elongate light source or illuminator 66 and a curved reflector surface 68 surrounding the source 66.

Figure 2:
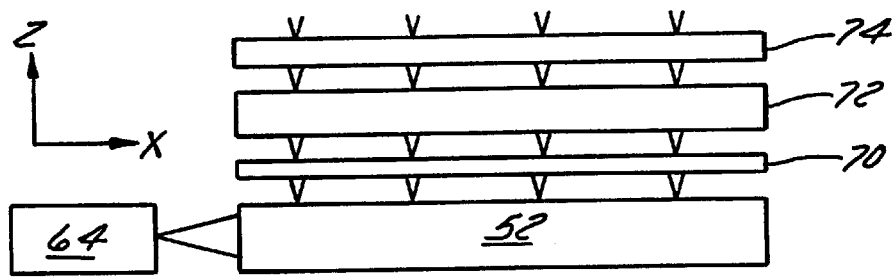
FIG. 2 illustrates various possible alternative constructions of a backlight apparatus and LCD assembly.

Pursuant to the present invention, the collimating waveguide 52 may include other configurations and other components combined therewith without departing from the spirit and scope of the present invention. For example, FIG. 2 illustrates that the light source 64 is connected to the waveguide collimator 52, which is in turn optically connected to a homogenizing diffuser 70. A liquid crystal element 72 is optically connected to the diffuser 70 and a light shaping diffuser 74 is optically connected to the output of the liquid crystal element 72. These and other variations and constructions are possible and fall within the scope of the present invention, some of which are described in greater detail herein. The order of the light shaping diffuser 70 and the liquid crystal element 72 may easily be reversed as well.

Figure 3:
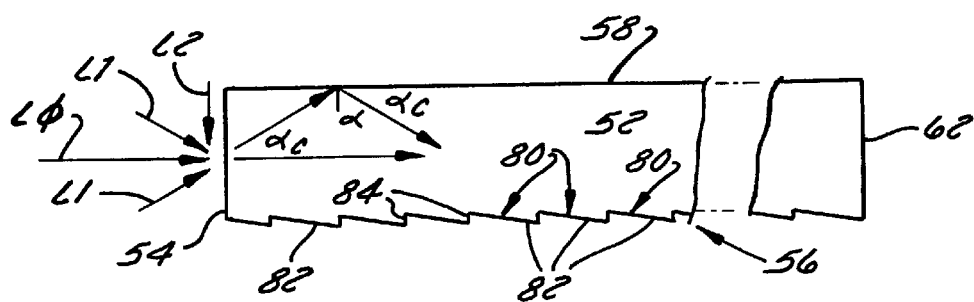
FIG. 3 illustrates a partial sectional view of a collimating waveguide according to the present invention.

FIG. 3 illustrates an enlarged view of a portion of the waveguide 52 including the bottom surface 56. As will be described in greater detail below, the bottom surface 56 includes a plurality of first facets 80, each of which includes a first facet bottom surface 82. The facets 80 in each embodiment are angled or slightly converging upward toward the top surface 58 in a direction away from the far end 62 of the waveguide 52. As discussed below, the facets 80 can either be linear or straight or can be curved without departing from the scope of the present invention. However, in each embodiment the facets converge toward the top surface in a direction away from the far end.

A. Illumination Sources

Figure 4:
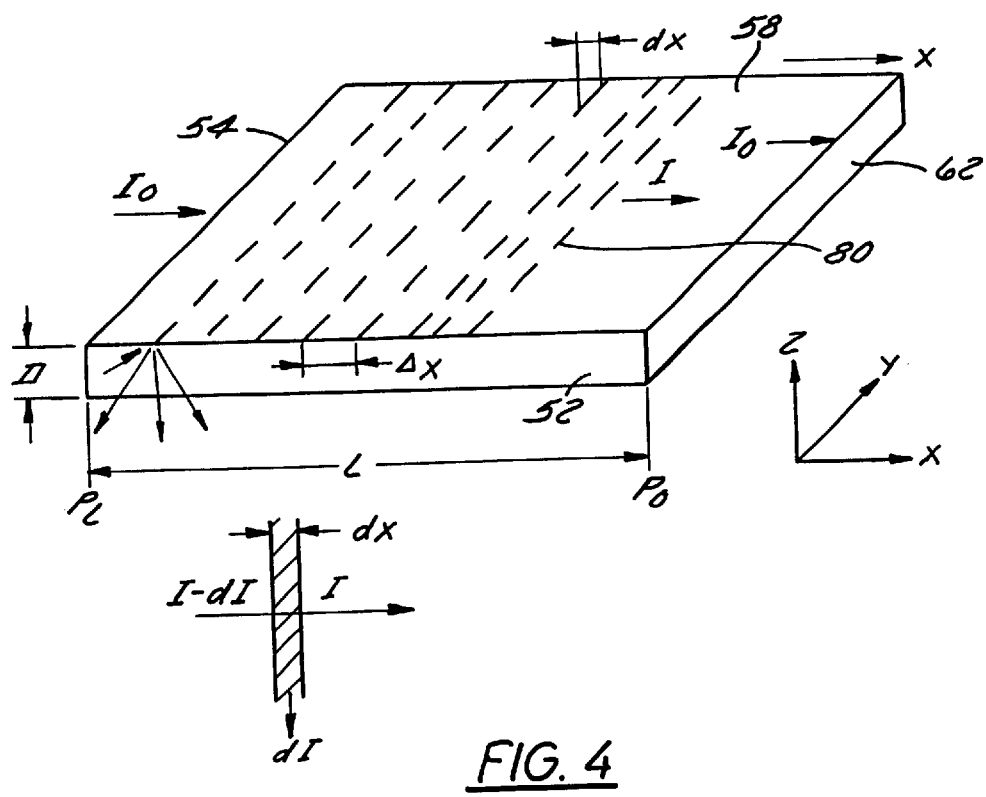
FIG. 4 illustrates a perspective view of a portion of a collimating waveguide according to the present invention.

According to Liouvilles' theorem, for an optimized light source 64 including an illumination element 66, the input distribution is almost uniform and, therefore, Lambertian. The following Equation (42) is a result of Liouvilles' theorem. As shown in FIG. 4 and discussed by Welford and Winston[1] and by Winston and Jannson[2], D is the width or thickness of the waveguide, d is the diameter of the light source or emitter, and β is the output angle in air: The 90° factor in Equation (42) is based on the fact that light is coming from the source in all directions. The optimum light collimating engine or source 64, according to Equation (42), provides not only maximum collimation (i.e., minimum angle β), but also uniform illumination. Those related designs that are almost optimum are also applicable to this invention.

$$d \sin 90° = D \sin \beta \qquad (42)$$

The particular type of light source 64 and/or element 66 may vary considerably without departing from the scope of the invention. For example, a CCFL tube, LED, laser diode, incandescent bulb or any other such point light source may be utilized. The invention is not to be limited to any particular source of light, although an optimized source is preferred.

B. Reflectors

A reflector surface 68 is preferably an extended source arcuate mirror and placed behind and surrounding the element 66. The term arcuate describes an arc, or curve in 2, or 3, dimensions. Welford[1] has discussed optimum collimation of light emitted by an extended source, especially spherical and cylindrical sources. The optimum design of the reflector is very characteristic of the intended light source and is not actually parabolic. A parabolic shape is actually unsatisfactory for extended sources. An arcuate mirror structure can provide an ideal fixture for attachment of the light source to the rest of the structure. As the illumination source moves away from the transformer, optimization of the design of the extended source arcuate mirror reflector increases in importance.

C. Collimating Waveguides

In order to be collimated, light must first be coupled into the collimating waveguide. Coupler configurations such as shown in FIG. 3 are well known in the art for use in communications applications. But in a typical communication application, the waveguide, (e.g., optical fiber), has a width of approximately 100 microns, or less. In the present application the width of the light pipe waveguide approaches several millimeters.

FIG. 3 represents a theoretical construction of the waveguide 52 into which light is being coupled. Light "$L_0$" that is incident normal to the entry edge or input end 54 of the waveguide passes directly into it without being refracted. Light "$L_1$" at an angle is refracted. According to Snell's law, low light entering non-normal to the incident surface is collimated. The light "$L_2$" at 90° is coupled at a critical angle of approximately 40° given an index of refraction "n" for the media of 1.55. The incident angle in the waveguide α is equal to approximately 50°. This value is approximately 50° and larger than $\alpha_c$ so all of the light which enters the waveguide collimator is contained within the waveguide collimator by total internal reflection (TIR).

FIG. 3 illustrates that light entering the waveguide will remain trapped within the waveguide due to total internal reflection (TIR). Even for the worst case for an incident angle of 90°, the light will still become trapped within the waveguide. The light enters the waveguide 52 under $\alpha_c$, the critical angle, when $$\sin\alpha_c = \frac{1}{n}; \sin\alpha = \sqrt{1 - \left(\frac{1}{n}\right)^2} \qquad (45)$$

assuming that the medium outside the waveguide is air and the waveguide is constructed of a transparent material having an index of refraction n. Typical low cost materials from which the waveguide can be fabricated are plastics, adhesives and glass. For these materials, the typical refractive index is approximately 1.55. Therefore, the critical angle, $\alpha_c$, is approximately 40°. Within the waveguide due to trigonometrical relationships α must be equal to approximately 50°. Therefore, all light is trapped within the waveguide because α is greater than $α_c$. For α larger than $α_c$ total internal reflection (TIR) occurs. If α is smaller than $α_c$ light will be leaked outside the waveguide (leakage not shown). And the leakage can be significant, such as on the order of more than 50%. Therefore, there is an abrupt transition when the angle varies from less than $α_c$ to greater than $α_c$.

Due to the fact that even for an incident angle of 90°, light is refracted for a critical angle $α_c$ for the transition from air to a material of index 1.55. Collimation of the light from the illumination source results, amounting to a change from an angular range of about 0° to 90° to an angular range of about 0° to 40°.

Collimating waveguides can be based on either metallic reflection or total internal reflection (TIR). In the former waveguide, the structure is typically empty. In the latter waveguide, the waveguide is material filled. Generally, the total internal reflection (TIR) waveguide is preferred because TIR produces 100% reflection while metallic reflection can easily drop to 80% caused by surface dirt, contamination or other problems with the reflective surfaces. Prior art waveguides generally have one metallized side for backlighting applications. A transformer is a generalized waveguide structure that not only transmits light through the waveguide but can also change the direction of this light. A transformer that changes the direction of light by 90° (orthogonally) can be used to deliberately leak light in a preferred direction for use in a backlighting application.

Collimation of light entering the waveguide 52 first occurs as the light enters the light input end 54 from the source 64. One hundred percent collimating efficiency cannot be achieved if the diameter d of the source is larger than the size D of the waveguide. On the other hand, if the diameter of the source is equal to or less than the size of the waveguide, optimum efficiency can be approached. As a practical matter, losses from the reflector surface or mirrors 68 prohibit 100% coupling. Any discussion of 100% coupling therefore implies that the absorptive losses due to interaction of the light with the mirror is being neglected.

Design of the reflector 68 must be optimized for a particular d/D ratio. Welford[1] provides ideal designs for any possible ratio. The ideal design means that the Liouville theorem is satisfied. Satisfaction results in 100% of the light being coupled to the waveguide. The ideal design also means that the distribution of light within the waveguide will be homogenous. Any of the resulting mirror or reflector designs will be quite far from being parabolic. A parabolic design is only optimum for a point, or line, source.

The volume within the interior of the reflector can be filled with a media or simply be air. In either case, the interior surface of the reflector 68 must be mirrorized (e.g., metallized). Although the reflection efficiency for deep IR and near IR can approach unity, the reflection efficiency for energy within the visible spectra can easily drop to 90% or 80% due to contaminants such as dirt on the surface. Maximum reflection efficiency for any wavelength is approximately 96% assuming a metallized mirror surface. In contrast, the efficiency of a TIR element is always 100%. A metallic reflector is never 100% even in the IR range. Preferably, the interior of the reflector 68 should therefore contain air in order to maximize a collimating effect of Snell's law. Even if the diameter of the source is larger than the size or thickness of the waveguide, the worst case 90° incident light will be collimated to approximately 40°.

2. Waveguide Facets

A general discussion of the distribution of scattering centers or facets follows. Referring to FIG. 4, a waveguide 52 is illustrated having a plurality of facets or grooves 80 wherein the grooves will have variable spacing, Δx. It should be noted that the facets 80 do not need to be laterally or longitudinally continuous and that the scattering centers can be separated, which the broken lines illustrate. $I_0$ represents incident light coming from the left. Light travels from the input end 54 to the light scattering and reflecting far end 62 by TIR and is reflected back from the far end back toward the input end. Thus, $I_0$ also represents light reflected from the far end 62. I is the intensity after passing through scaler distance x back toward the light input end 54. Total length of the device is L. dx represents an infinitesimally small portion of the scaler distance x. FIG. 4 shows a slice or section represented by dx as illustrated. In the general geometry, $I_0$ is input intensity from the right, reduced to $I_0$–dI because dI is leaked to the bottom. This property holds for any coordinate x. In fact, a small amount of leakage can occur as light initially passes by TIR from the input end 54 to the far end 62. This leakage is ignored in the present discussion but the following analysis can be applied for this initial leakage as well.

General Equation (1) indicates that the lost leakage of light –dI must be proportional to I.

$$-dI = aI\rho dx \quad (1)$$

dI is also proportional to the thickness dx of the slice, as well as to the density of the facets 80, which is represented by ρ. The character a is a proportionality constant which will be interpreted below. Equation (2) indicates that the density is equal to the number of facets per unit incremental distance.

$$\rho = \frac{dN}{dx} \quad (2)$$

So the units for ρ are $cm^{-1}$. $I=I_0$, for x=0 from the far end 62. The number of facets per infinitesimal length dx is dN. $N_t$ is the total number of facets in the waveguide.

In order to preserve uniform leakage of the light to the top surface, dI must be proportional only to dx. Because I necessarily decreases as light moves further away from the far end 62 across the device, ρ must correspondingly increase moving away from the far end 62 toward the input end 54. Equation (4) is the same as Equation (1) but substituting A for Iρ, for uniform leakage condition:

$$dI = -aAdx \quad (4)$$

Since a and A are both constant, integration yields Equation (5).

$$I = I_0 - aAx \quad (5)$$

Equation (6) represents that the density of grooves or facets 80 is equal to a constant divided by Equation (5), following directly:

$$\rho = \frac{A}{I} = \frac{A}{I_o - aAx} \quad (6)$$

Therefore, $\rho$ is a function of x and increases monotonically from point $L_0$. A discussion of the physical meaning of A and a follows. Both are constants.

$$-dI = aI\frac{dN}{dx}dx = aIdN \qquad (6b)$$

Interpreting Equation (6B) yields Equation (6C).

$$I = I_0 e^{-aN} \qquad (6c)$$

Equation (7) defines a.

$$a = \frac{-\frac{dI}{I}}{dN} \qquad (7)$$

dI/I represents the relative leakage. dN is the number of grooves per infinitesimal length. a is percentage of leakage per groove. Equation (8) represents that intensity at the full length L or point $L_1$ is 0.

$$aA = \frac{I_o}{L} \qquad (8)$$

Equation (8) represents a singularity because the density of $\rho$ at the full length L cannot reach infinity. For practical purposes, it can be assumed that no more than 5% of the available light is linked all the way from the far end back to the light input end 54. Equation (18) represents aN=3 with the exponent given a value of −3. This, according to Equation (6C), corresponds to 5% of the light being returned at the light input end in the waveguide. This light would be reflected back by the reflector 68 along with new incoming light.

$$aN=>3=>I=I_0 e^{-3} \cong 0.05I_0 \qquad (18)$$

Having a higher density would result in less light left at the end of the length, but that could be limited by the physical practicality of producing very tightly packed facets 80.

Equation (20) represents the total number of facets, equal to the length divided by $\Delta x$, which is the average distance between facets, $\overline{\Delta x}$:

$$N_T = \frac{L}{\Delta x} \qquad (20)$$

The following example uses an average length between facets of 100 microns across a total length slab of 20cm yielding a total number of facets of approximately 2000 as represented in Equation (21).

$$N_T = \frac{20\,cm}{100\,\mu m} = \frac{200\,mm}{0.1\,mm} = 2000 \qquad (21)$$

Equation (19) can now be calculated because $N_T$ is known.

$$aN_T=3 \qquad (19)$$

Equation (22) represents that a is equal to $$a = \frac{3}{2000} = 1.5(10^{-3}) = 0.0015 \qquad (22)$$

The average leakage per facet is thus $1.5 \times 10_{-3}$ as represented in Equation (22).

A. Wedge Shaped Waveguide

Figure 5:
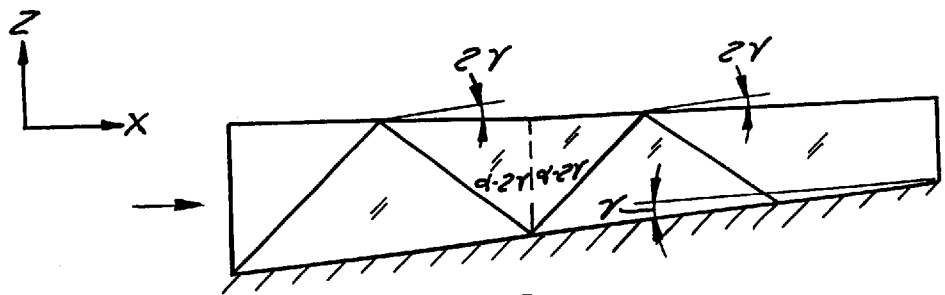
FIG. 5 illustrates a sectional view of a wedge collimating waveguide.

Collimation by a generalized wedge concept will now be described. Referring to FIG. 5, trigonometric relationship of the angle of incidence $\alpha$ within this wedge will cause the angle of incidence to be reduced by $2\gamma$ after each bounce, assuming that $\gamma$ is the wedge angle. Assuming the initial entry angle is approximately 40°, $\alpha$ will equal 50°. This is far larger than the critical angle so the first bounce will be by total internal reflection (TIR). At some point thereafter there will be a bounce where some portion of the ray is leaked. Assuming the wedge angle $\gamma$ is 0.5°, $2\gamma$ is 1°, and in order to approach 40° a minimum of 10 bounces is required, counting only the bounces from the bottom.

Equation (49) describes the condition for leakage starting with an incident angle $\alpha$ and a wedge angle $\gamma$.

$$\alpha - N(2\gamma) = \alpha_{cond} \qquad (49)$$

A monolithic wedge divided into a series of solitudes can be characterized as a distributed wedge.

B. Straight Facet Surfaces

Figure 6:
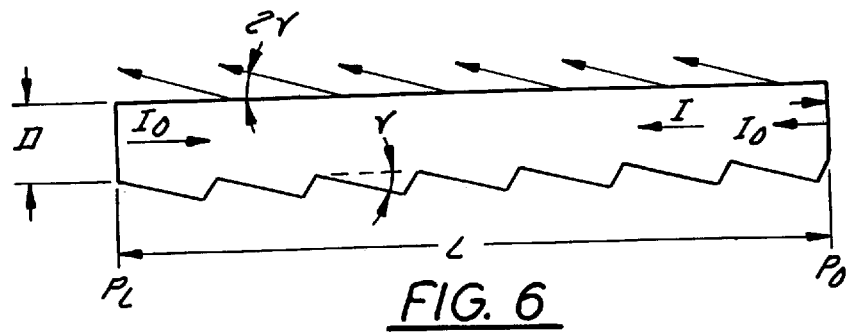
FIG. 6 illustrates a sectional view of a distributed wedge collimating waveguide according to the present invention.

Referring to FIG. 6, a distributed wedge according to the present invention is shown having straight facets. A distribution of the wedges provides a homogeneous illumination. This concept is similar to Equation (1). This derivation displayed $\rho$ as a function of x holding the variable a constant. In the following derivation, the variable a is a function of x and $\rho$ is constant. Alternatively, if the variable a is constant and $\rho$ is variable, the other derivation can be used. In the following derivation P replaces I.

$$-dP = a(x)P\rho dx \qquad (101)$$

P is the optical power. Equation (101) is the analog of Equation (1), except that the variable a is a function of x and $\rho$ is constant.

$$\rho = \text{constant} = \frac{dN}{dx} \qquad (102)$$

Equation (118) sets p x a equal to a constant A.

$$dP = -A\rho dx \qquad (118)$$

Equation (123) should be compared to Equation (6).

$$a = \frac{A}{P} = \frac{A}{P_o - A\rho x} \qquad (123)$$

It is clear that in Equation (123) a is a function of x whereas in Equation (6) $\rho$ is a function of x. A is a constant in both equations. In Equation (123), a is variable where $\rho$ is constant. The variable a is the leakage rate per microelement.

$$\frac{\Delta P}{P} = 2\gamma \cot an\beta \Rightarrow a = \frac{2\gamma \cot an\beta}{\Delta N} \qquad (126)$$

Full Lambertian dispersion would be $\pi/2$. This can be reduced to $2\beta$, where $\beta$ is the critical angle from the previous interaction, approximately 40°, although it can be smaller assuming that some collimation process has occurred before. The angle $\gamma$ should be calculated in order to obtain the desired leakage. Intensity is $J=J_0 \cos \alpha$. While I is optical intensity and is expressed in units of watts per square meter, for example, radiant intensity, J, is expressed in units of watts per steradian. But in this derivation only the two dimensional case is being considered and J is expressed in watts per radian. Lambert's law is represented by $J=J_0 \cos \alpha$. Integration in Equation (110) describes the total power going through the waveguide from $-\beta$ to $+\beta$.

$$Po = 2\int_o^\beta J\,d\alpha = 2\int_o^\beta J_o\cos\alpha\,d\alpha \tag{110}$$

$\Delta P$ in Equation (113) is the leakage from $2\gamma$.

$$\Delta P = 2\gamma[\sin\beta - \sin(\beta - 2\gamma)] \tag{113}$$

Assuming that $\gamma$ is much less than 1 radian, this $\Delta P$ is used in the following Equation (125):

$$a = -\frac{\frac{\Delta P}{Po}}{\Delta N} \tag{125}$$

Equation (126) describes relative leakage for each event. In the distributed wedge the relative leakage per event is proportional to $\gamma$ and fitting Equation (123) into Equation (126) yields Equation (128).

$$\frac{2\gamma\cot\beta}{\Delta N} = \frac{A}{P_o - A\rho x} \tag{128}$$

In Equation (128), $\gamma$ is changing with x according to the relationship shown in Equation (132).

$$2\gamma(x) = \frac{A\Delta N}{(P_o - A\rho x)\cot\beta} \tag{132}$$

As $\gamma$ increases with x to provide constant leakage, it is enabled to regulate $\gamma$. Alternatively, the density $\rho$ can be varied as was previously shown. Assuming the density is constant at 10 per millimeter, $\rho$ is constant as shown in Equation (136).

$$\rho = \frac{dN}{dx} = \frac{10}{mm} \tag{136}$$

Assuming a total length L of 20 cm, Equation (137) shows that the leak per grove is small.

$$a_o = \frac{1}{200\text{ mm} \cdot 10\text{ mm}^{-n}} = \frac{1}{2000} \tag{137}$$

Equation (140) shows that the beginning angle only needs to be 1/10th of a degree.

$$2\gamma_c = 2 \cdot 10^{-3} = 0.1° \tag{140}$$

Again, the assumptions are ignoring skew rays. Illustrating skew rays would only be possible with the full ray tracing scheme program. It would be advantageous in order to accommodate skew rays to modify the orthogonal shapes to cylindrical symmetric shapes. This would involve repeating a cross section rotated around a vertical axis. Rotation can also be based on an ellipse as opposed to a circle. In a (z,x) cross section, the triangles are representing prisms, however, when considered along the (x,y) plane for the combination of skew rays, such triangular sections may actually become cones or more complex elliptical shapes in order to accommodate the skew rays. Such a topology would be complex.

A more precise version of Equation (128) follows, including a consideration of Fresnel reflection. The power p in Equation (128) is replaced by Equation (300):

$$P \to P(1-R-D) \tag{300}$$

Where R is a Fresnel reflection coefficient, and D is an absorption coefficient.

Therefore, Equation (116) becomes Equation (301):

$$-dP = a(x)P(x)[\Delta - R(x) - D]\rho dx \tag{301}$$

where the D-coefficient is assumed to be constant, as well as the $\rho$-coefficient. In order to preserve beam leak uniformity, the following Equation (302) should be satisfied:

$$a(x)P(x)[\Delta R(x)-D] = \text{const.} = A' \tag{302}$$

where A' is a new constant, analogous to the constant A. Using the same reasoning as above, the following Equation (303) is obtained for the a-coefficient.

$$a(x) = \frac{A'}{(P_o - A'\rho x)[1 - R(x) - D]} = 2\delta(x)\cot\beta \tag{303}$$

Equation (303) is identical to Equation (128), assuming R=D=0, and using the $\alpha$-angle symbol instead of $\delta$-angle. For $\delta \ll 1$, and $\alpha \ll 1$, the relation between $\delta$ and $\gamma$ is shown in Equation (304):

$$\delta^2 \cong \gamma\sqrt{n^2 - 1} \tag{304}$$

where Snell's law has been included. The angle $\delta$ is the leakage angle and $\gamma$ is the prism angle. This is shown in Table 1.

TABLE 1

LEAKAGE ANGLE $2\delta$ VERSUS WEDGE ANGLE $\gamma$ FOR n = 1.55,

| $\gamma$ | 0.5° | 1° | 1.5° | 2° |
|---|---|---|---|---|
| $2\delta$ | 11.6° | 17.5° | 21° | 24.5° |

Table 1 illustrates that even for small $\gamma$-angles, $\delta$-angles can be quite large. For angles, close to critical angle $\alpha_c$ (sin $\alpha_c = \Delta/n$), the Fresnel reflection coefficients can be quite high. For example, for $\gamma = 0.2°$, we obtain R=51%, while for $\gamma = 0.50$, R=30%.

As an example, an approximate solution of transcendental Equation (303) follows. Since the R-coefficient depends on $\delta$, Equation (303) is a transcendental one in such a sense that it cannot be solved analytically. In order to solve Equation (303) approximately, it is assumed, in the first iteration step, that an $\alpha_L$-value (i.e., $\gamma$-value, for x=L) equals 0.5°, which leads to the Fresnel reflection coefficient value: R=30%. It is further assumed that at the light input end 54 of the waveguide 52, only about 5 % of light power reflected from the far end 62 remains; i.e., $P(L)=0.05P_0$. An absorption coefficient value (conservative) of 2% is also assumed. Then, for n=1.55, and $a_c=40°$, $\alpha \cdot L=0.74°$. It will be appreciated that the first iteration step worked relatively well.

Using Equation (304), $\delta=7°$ is obtained. Thus, the leakage angle (in the air) of $2\delta$ is equal to 14°. Of course, for x=0, the values of angles $\gamma$ and $\delta$ (i.e., $\gamma_0$ and $\delta_0$-values) will be much smaller. Therefore, in this case, the $\gamma$-distribution is non-uniform. This numerical example demonstrates how to design the distributed wedge system. Its exemplary parameters have been summarized in Table 2.

TABLE 2

SUMMARY OF EXEMPLARY PARAMETERS OF THE DISTRIBUTED WEDGE SYSTEM

| # | PARAMETER | SYMBOL | VALUE |
|---|---|---|---|
| 1 | LENGTH | L | 20 cm |
| 2 | FACET DENSITY | $\rho$ | 10/mm |
| 3 | WEDGE REFRACTIVE INDEX | n | 1.55 |
| 4 | WAVEGUIDE THICKNESS | D | 3 mm |
| 5 | POWER FRACTION AT THE END | $P_L/P_O$ | 0.05 |
| 6 | WEDGE ANGLE AT x = L | $\gamma_L$ | 0.74° |
| 7 | MAXIMUM LEAKAGE ANGLE AT x = L | $2\delta_L$ | 14° |

C. Curved Facet Surfaces

Different parts of the surface of each facet are available to different rays coming from different directions. Therefore, a flat surface facet is not always optimum because the available light is not ideally distributed.

Figure 7:
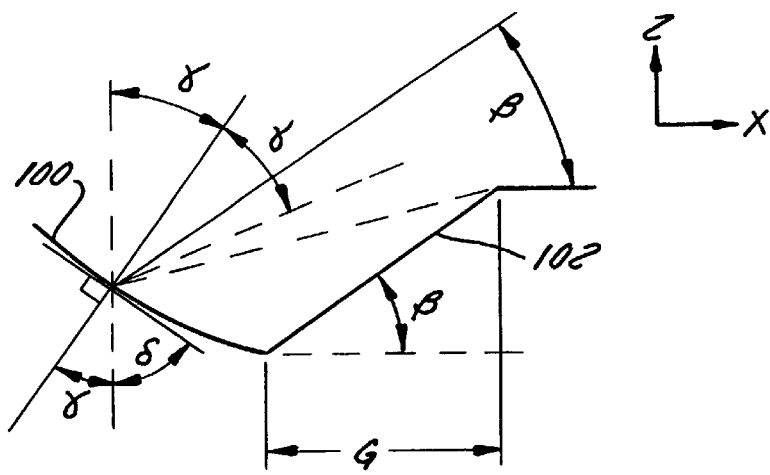
FIG. 7 illustrates a schematic sectional view of a portion of a collimating waveguide having curved facets.

By ignoring skew rays, an optimized curved surface can be easily designed by assuming homogenous incident flux. For example, the bottom of an isosceles pit pyramid is not available to a low incident angle ray. It is desirable to optimize the design of the facet so as to weight the intensity of the flux cones that are available to any given surface of the reflection. For example, constructing an arc instead of a flattened prismatic surface reflecting rays coming from the left requires defining the maximum and minimum angles for those rays which can strike any part of the arc based on the geometry of the waveguide. More specifically, at the top of the arc waves cannot arrive at angles lower than 0° because they would be intercepted by the previous apex. In contrast, at the bottom of the arc, waves can arrive at a wider range of angles. Referring to FIG. 7, bisecting the center of both of these angles will result in a simple geometric definition of the tangent of the curve. However, the flux weighted center point of each of these two angles will be slightly different from the geometric bisectrix because the waveguide is not homogeneously illuminated from the light source due the light source itself generating a nonplanar, albeit somewhat symmetric, flux distribution.

The curved tooth facet 100 can be mirrored and can be referred to as a vignetting effect where there is a limited size and some parts of the beam are blocked by structures. The alternating second facet 102 can be flat. Although it is shown as flat to facilitate analysis of the lowest-most ray, the second facet can actually be convex or concave as well. At the base of the apex, the angular spectrum is very limited. The widest angular spectra is at the top, based on the incoming rays. The coordinate system labeled has its origin at the base of the structure. The problem is to find z as a function of x for the curved surface.

Figure 8:
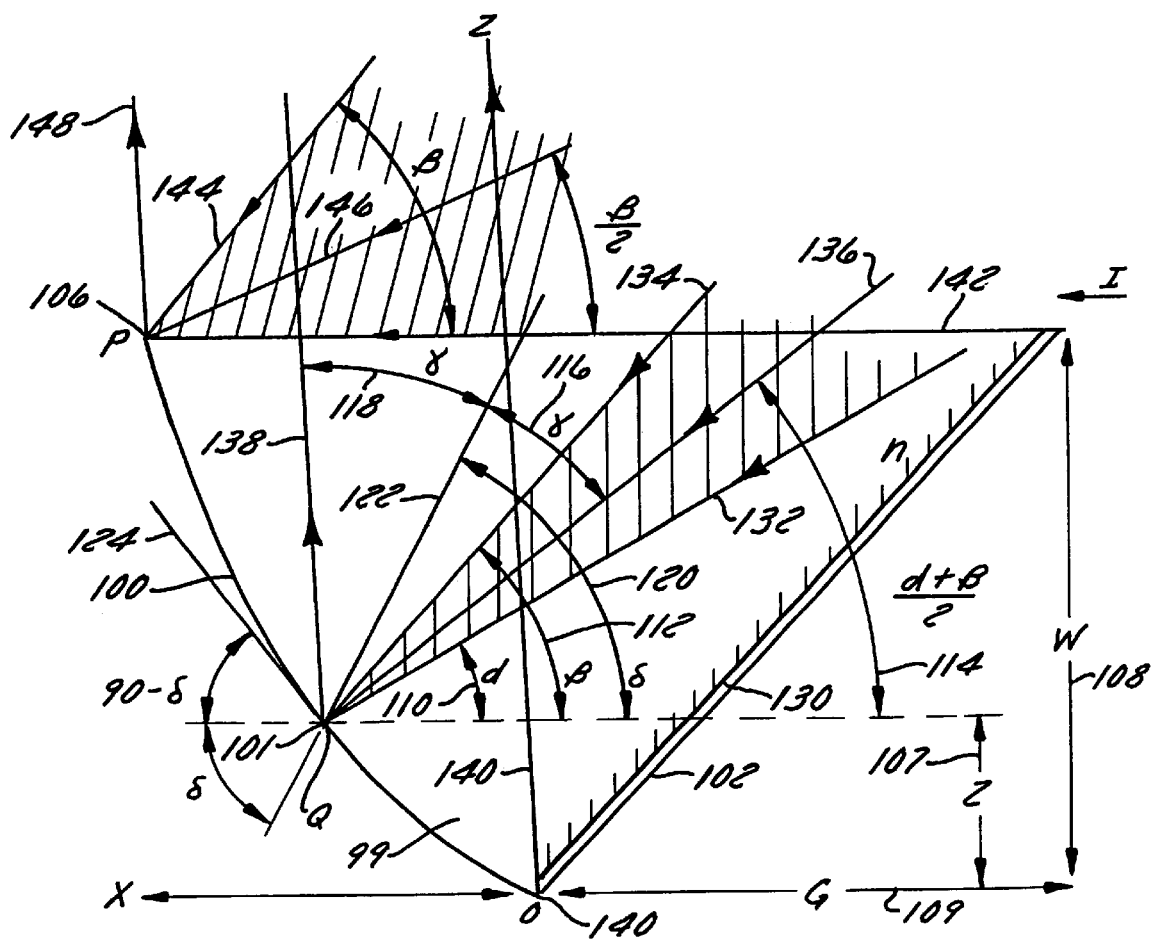
FIG. 8 illustrates a geometrical construction of the portion of a collimating waveguide as shown in FIG. 7 according to the present invention.

Referring to FIG. 8, the sawtooth geometry, with curved surface or facet 100 is described, leading to the optimum curved surface z(x). This is a curved surface rather than a flat surface because the incident beams at points O, Q, P in FIG. 8, have increasing divergence as illustrated by the hatched areas in FIG. 8.

A description of FIG. 8 follows which shows a curved wedge or tooth 99. The vertex 104 of the nonimaging optic(s) (NIO) tooth is O and is positioned following beam collimation optimization according to the Louiville theorem as generally explained by Wilford[1] and Winston[2].

Arbitrary point Q 101 is located on the curve: z=z(x), that should be optimized. Of course, arbitrary point Q 101 has two coordinates (x,z). The highest point 106 on the curved wall is P. The height of the tooth 108 is taken between P and O. The horizontal length of the straight wall is represented by 109. The z-coordinate of point Q is represented by 107. Point Q is also the origin of the coordinate system.

The lowest angle ($\alpha$) of incident rays at point Q is represented by 110. The highest angle ($\beta$) of incident rays at point Q is represented by 112. This is also the maximum angle of beam divergence. As a result of total internal reflection (TIR) inside collimating waveguide, the maximum value of angle $\beta$ is: ARC TAN (1/n), where n is reflective index of the tooth that is surrounded by air. For n=1.55, $\beta \cong 40°$.

A bisect angle, equal to $$\frac{\alpha+\beta}{2},$$

is represented by 114. The incident angle ($\alpha$) of bisect ray, which is a central ray for the beam (or, ray bundle) approaching point Q, is represented by angle 116. Angle 118 is the reflection angle of the bisect ray and is equal to angle 116.

120 represents the symmetrical angle ($\delta$) for bisect rays. It should be noted that symmetrical line 122 is perpendicular to tangential line 124. Therefore, the tangential angle is 90°−$\delta$ (or, $\pi/2-\delta$).

102 is a straight line (or, wall in cylindrical geometry) of the tooth. 100 is the curved facet surface that characterizes the optimum NIO profile, minimizing divergence of the output beam. This is because, by contrast to the prism, the ray-bundle at any point at the surface is reflected symmetrically into a vertical direction. This is due to the fact that the bisect line of any ray bundle is reflected exactly vertically.

124 is the tangential line into the curve at point Q. 130 is the incident ray at point O. This is the maximum divergence ray. 132 is the lowest inclination ray for the ray bundle at point Q. 134 is the highest inclination ray at point Q. 136 is the bisect ray for the ray bundle at point Q. 122 is the symmetrical line to bisect incident ray 136 and bisect reflected ray 138, which is precisely perpendicular to tangential line 122.

138 is the reflected ray into incident bisect ray 136 which is precisely vertical, or parallel to z-axis. 140 is the reflected ray to incident ray 130 which is also precisely vertical, according to the optimization principle. 142 is the lowest inclination incident at highest Point P, which has a horizontal direction. 144 is the highest inclination which is assumed to be $\beta$, in order to accommodate the maximum amount of rays. 146 is the bisect ray at point P. 148 is the reflected ray to bisect ray 124 which is always precisely vertical, according to the optimization principle.

An analytical procedure for defining the optimized curve z=z(x) follows. According to FIG. 10, the angle 120, or $\delta$, is $$\delta = \frac{\pi}{4} + \frac{\alpha+\beta}{4} \qquad (200)$$

where $\alpha$ is angle 110 and $\beta$ is angle 112. It should be noted, that, while according to the optimization principle, $\beta$-angle is constant, for any point Q at the curve, α-angle is defined as follows:

$$\tan\alpha = \frac{w-z}{G} \quad (201)$$

i.e., α is a function of z-coordinate. Thus, the δ-angle is also a function of z. Therefore, line 113 is not straight but curved, according to the optimization principle; and $$\delta(z) = \frac{\pi}{4} + \frac{\beta + \alpha(z)}{4} \quad (202)$$

where $$\alpha(z) = \arctan\left(\frac{w-z}{G}\right) \quad (203)$$

The basic differential equation defining the optimization principle is $$\frac{dz}{dx} = \tan(90° - \delta) = \frac{1}{\tan\delta} \quad (204)$$

or, $$dx = dz \tan\delta \quad (205)$$

where dx and dz are infinitesimal changes or coordinates (x,z), at point Q of the curve using Equations (202), (203), (204) and (205), we obtain, $$dx = dz\tan\left[\frac{\pi+\beta}{4} + \frac{1}{4}\arctan\left(\frac{w-z'}{G}\right)\right] \quad (206)$$

and the solution of the problem, is $$x(z) = \int_o^z \tan\left[\frac{\pi+\beta}{4} + \frac{1}{4}\arctan\left(\frac{w-z'}{G}\right)\right] dz' \quad (207)$$

Typically, the solution is presented in the inverse form to Equation (207):

$$z = z(x), \tan\beta = \frac{W}{G} \quad (208)$$

Figure 9:
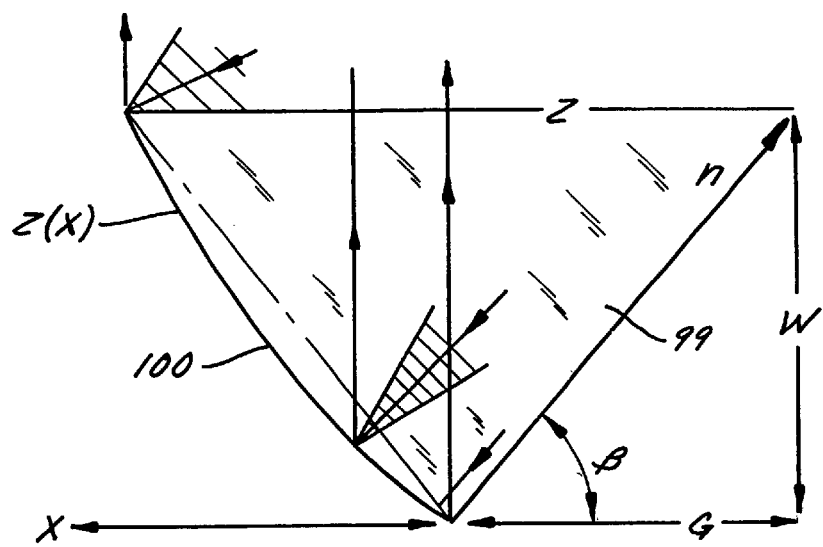
FIG. 9 illustrates a geometrical construction of the portion of a collimating waveguide as shown in FIG. 7 according to the present invention.
Figure 12:
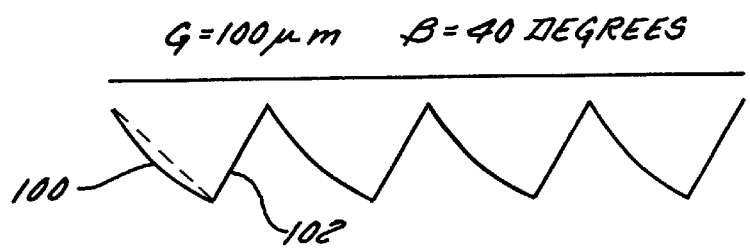
FIG. 12 illustrates a portion of a curved facet collimating waveguide according to the present invention.

The Equation (208) can be numerically calculated for various values of G and angles β. A calculation and illustration for two-cases of curve z(x), where x(z) is determined by Equation (207) as shown in FIG. 9. FIG. 12 shows a multiplication of the optical element shown in FIGS. 8 and 9 for uni-directional illumination.

Figure 10:
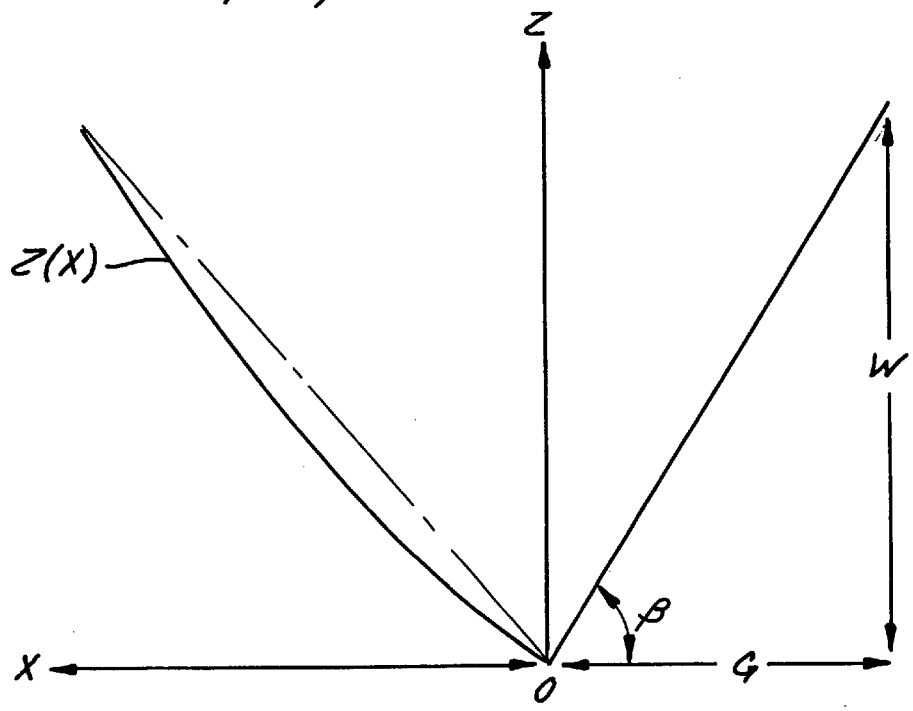
FIG. 10 illustrates a geometrical construction of the portion of a collimating waveguide as shown in FIG. 7 according to the present invention.
Figure 11:
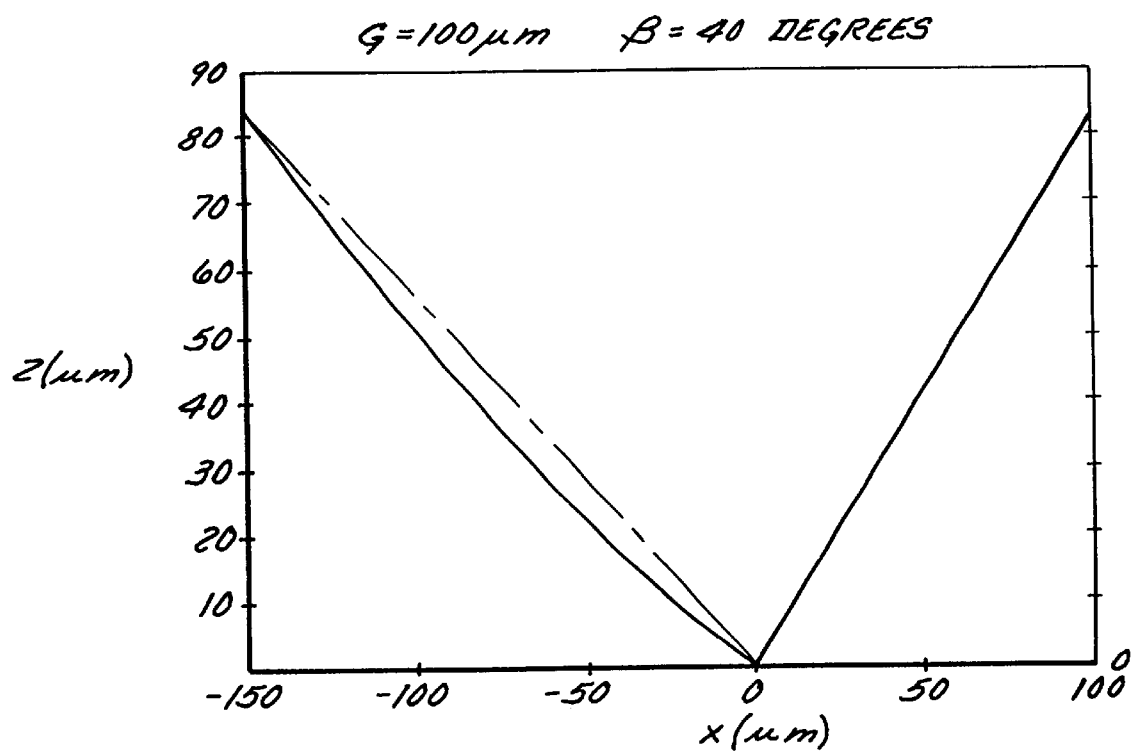
FIG. 11 illustrates a graphical representation of the portion of a collimating waveguide as shown in FIG. 7 according to the present invention.

Referring to FIG. 10, a calculation and illustration of the sawtooth or curved facet 99 design for the case: G=100 μm, β=40° is shown. We see that the surface 102 is indeed curved. The single sawtooth element from FIG. 10 has been illustrated in detail in FIG. 11 and multiplied in FIG. 12 in order to show a practical sawtooth applied to one side of the collimating waveguide as in FIG. 13. It should be noted that skew rays have not been considered in this analysis, for simplicity.

The shape of the curve in the vignetting effect curved tooth is a function not only of the geometry of the chasm defined by the first facet and the second facet of each optical element but also the output of the light engine. Thus, it is useful to consider the flux dispersion of the light engine and the flux dispersion within the collimating waveguide.

3. Fabrication of Collimating Waveguide

Conveniently, the collimating waveguides of the present invention can be carried out by using any fabrication method. For the manufacturing operation, it is moreover an advantage to employ a replication/lamination method.

Isosceles triangles can be cut when fabricating the master for replicating the collimating waveguide provided that there is no undercutting. Any undercutting inhibits mold release. There is a general degradation as you move from the master to the submaster to the finished part. Degradation removes the edges. Much of this degradation is due to the forces exerted during release. Thus, the shape on the master is not necessarily the finished facet structure. Although the facets themselves tend to become convex due to the release process, concave shapes are possible to make. Further, it is relatively easy to combine two facets to define a compound concave structure.

To fabricate the master for the above-discussed assemblies of optical elements, a metal master can be machined with diamond tooling. Machining flat facet microgrooves with cylindrically variable angles is possible. A spherical or aspheric curve can be cut on a diamond and the resulting curved optical microelement could be as small as 50 microns. Variable angles are possible with curved facets as well. Variable spacing is possible with both flat facets and curved facets. In addition, imaging microlenses can be cut as small as 200 microns. However, the diamond tooling wearsout so it is advantageous to fabricate one master and then replicate a series of submasters.

A. Liquid Crystal Displays

Liquid crystal displays can be high definition and/or low definition. The number of pixels can be, for example, 2000×2000. Presently the smallest size pixel resolution is approximately 20 microns. These LCDs produce undesirable pixeling effect. Viewers can actually see these pixel demarcations.

B. Diffusers

An important function that can be carried out by a diffuser located between the collimating waveguide and the LCD is to cancel pixeling effect from the LCD. Such a use of a diffuser can be termed homogenizing.

In addition, the directionality of the light emitted from the LCD can be optimized through the use of a diffuser with directional characteristics located on top of the LCD. This would allow a private limited viewing range from a laptop computer. Directional diffusers are non-Lambertian diffusers, optical properties of which are defined by planewave response as discussed in U.S. Pat. No. 5,365,354. It can be assumed that the incident waves are not fully collimated but have divergence of perhaps ±10°. Of course, the divergence from the diffuser cannot be less than the divergence that is reaching it. Typical values would be from approximately 1–40° half angle. As a practical matter, if the incident divergence is approximately 20° and the divergence of the diffuser is approximately 1° then the output would be approximately the same as the input with regard to divergence. Diffusers do not help in collimation. However, diffusers most definitely help in homogenization. Specifically, such diffusers can obviate pixeling from the LCD.

A diffuser can be located between the groove structure and the LCD structure and/or a diffuser can be located after the LCD. In the former case, the diffuser will homogenize only the grid structure and not the pixels. In the latter case the diffuser would be homogenizing both structures.

C. Scattering and Reflective Far End

The far end 62 of the waveguide 52 is both a light scattering surface and a reflective surface. The particular construction of the far end 62 may vary considerably without departing from the scope of the invention. Examples of suitable surfaces include reflective diffuser surfaces, reflective holographic surfaces, or any other type of surface that both reflects and scatters incident light.

4. Description of Specific Embodiments

Referring to FIGS. 1 and 3, light source 66 is located within the space defined by the reflector surface 68. The light source 66 can be a cold cathode fluorescent bulb, a hot cathode fluorescent bulb, or any other type of light source as previously described. Light from the light source 66 is directed toward the waveguide collimator 52.

The light source 66 can be more generally referred to as an illumination source. The waveguide collimator 52 includes incident end or light input end 54. The bottom surface 56 of the waveguide collimator 52 is provided with a first plurality of substantially parallel optical elements or facets 80. Each of the first plurality of substantially parallel optical elements 80 includes a first facet 82 and a second facet 84. The waveguide collimator 52 also includes the top surface 58 and the far end 62.

With regard to the examples shown, and other embodiments, light from the illumination source can be directly incident upon the incident end. This means that there is no structure between the illumination source and the incident end. For example, the space between the illumination source and the incident end should be occupied by air, or vacuum. By the absence of any structure between the illumination source and the incident end, a higher degree of collimation is achieved when light passes through the incident end in accordance with Snell's law.

Figure 13:
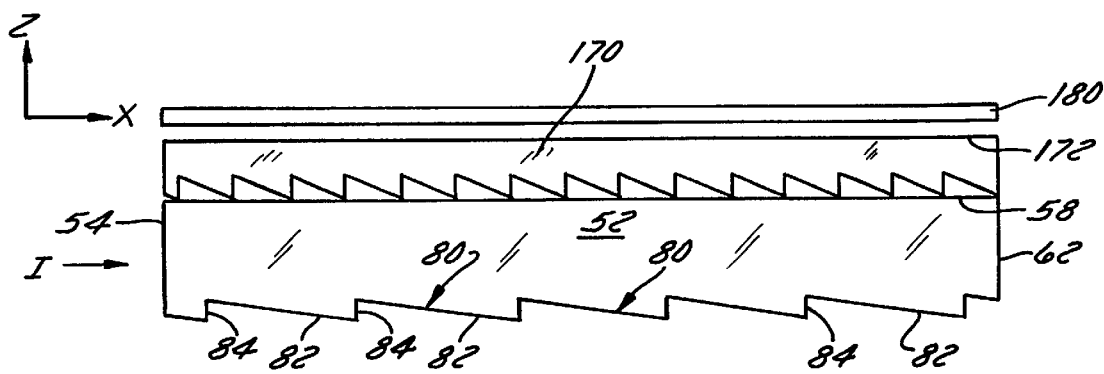
FIG. 13 illustrates a side elevational view of a portion of a liquid crystal display system according to the present invention.

Referring to FIG. 13, the distributed wedge collimating waveguide 52 includes the first plurality of substantially parallel facets 80. Each of this plurality of facets 80 includes a mirrored first facet 82 that can be substantially flat and the second facet 84 that can be substantially flat. First distributed wedge collimating waveguide 52 also includes the top surface 58. The angle γ, which is defined as the angle that the mirrored first facet 82 makes with the top surface 58, should be optimized. A second distributed wedge collimating waveguide 170 is optically connected to the first distributed wedge collimating waveguide 52. The second distributed wedge collimating waveguide 170 includes an upper surface 172. A first diffuser 180 for homogenizing light from the top surface 172 is optically connected to the second distributed wedge collimating waveguide 170.

An additional waveguide such as a diffuser including a plurality of imaging optics can be located between the first diffuser 180 and the second distributed wedge collimating waveguide 170. In addition, a diffuser angular filtering film can be located adjacent the incident end 54.

Figure 14:
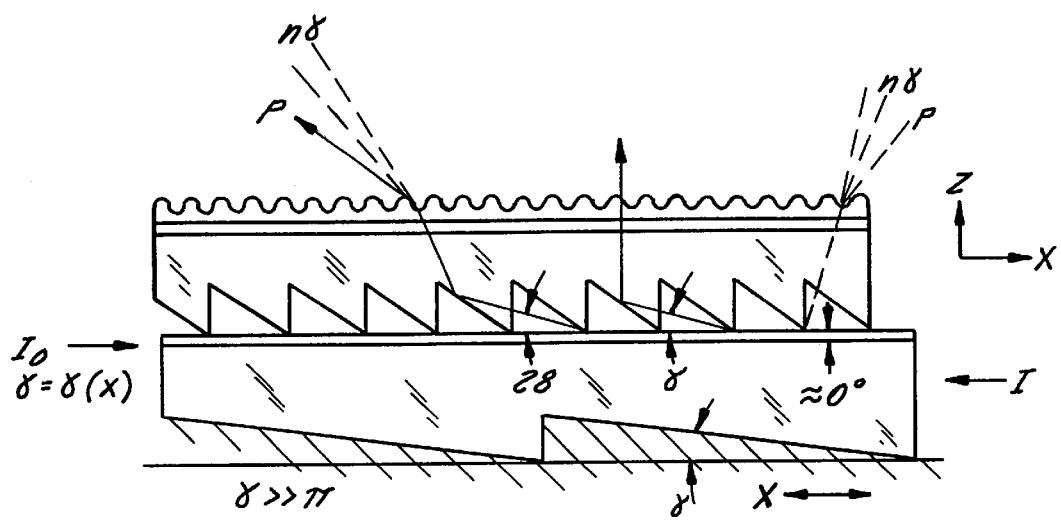
FIG. 14 illustrates a schematic view of the portion of the liquid crystal display system shown in FIG. 13.

FIG. 14 shows a ray diagram for the apparatus depicted in FIG. 13. At the right of FIG. 14, a ray is leaked at near a zero degree angle to the top surface. It will be appreciated that this ray is emitted from the top of the diffuser toward the right. In the middle of FIG. 14, a ray is emitted from the top surface at an angle γ. This ray emerges normal to the plane defined by the diffuser. Toward the left of FIG. 14, a ray emerges from the top surface at an angle to γ. It will be appreciated that this ray is emitted from the diffuser toward the left. Other embodiments are also possible without departing from the scope of the present invention.

Figure 15:
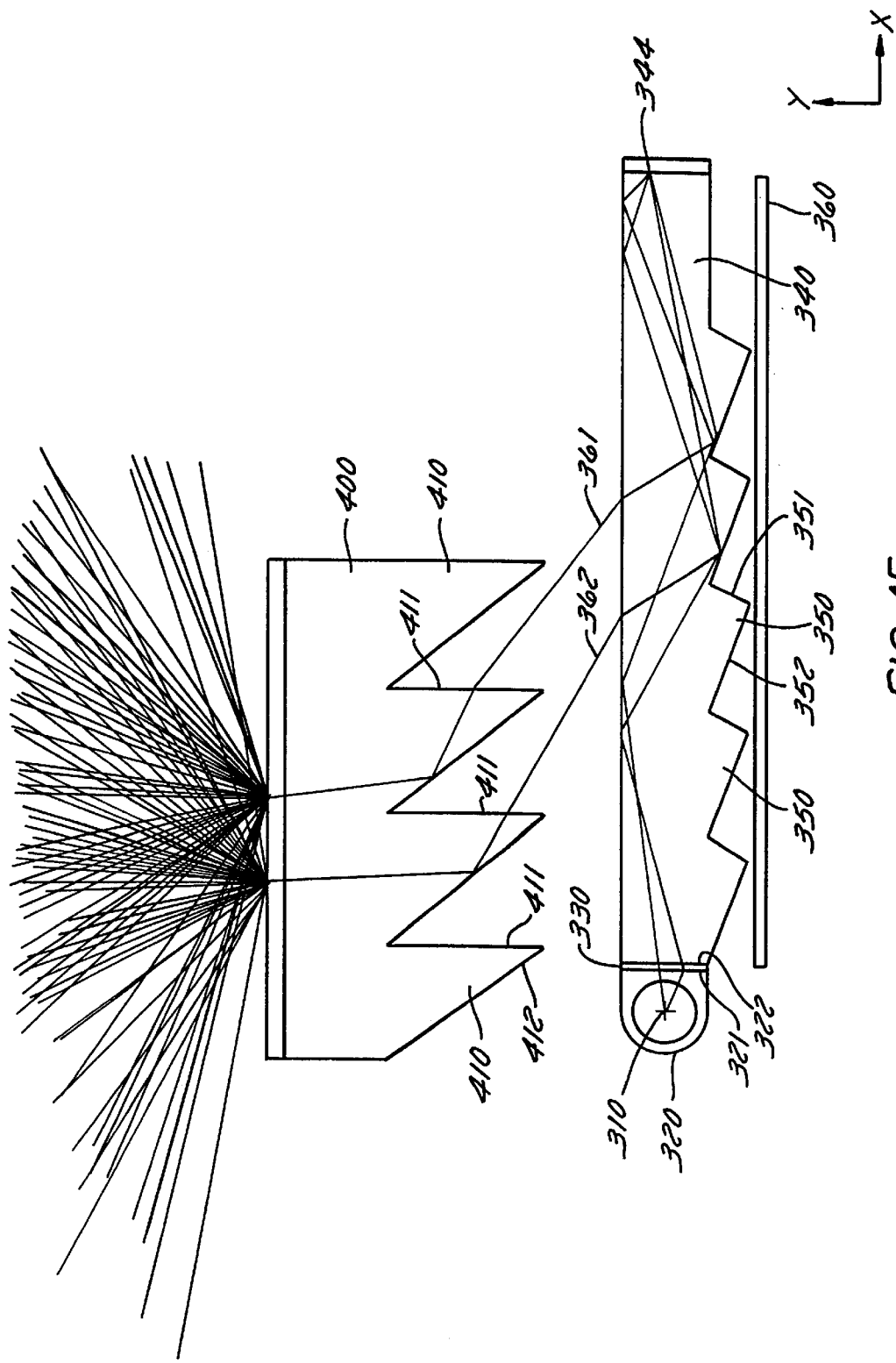
FIG. 15 illustrates a schematic cross sectional view of a liquid crystal display backlighting system according to the present invention.
Figure 20A:
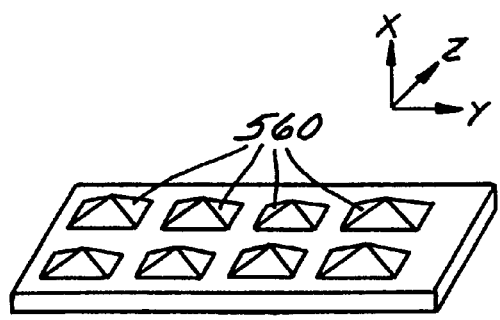
FIGS. 20A, 20B and 20C illustrate several embodiments of angular filtering films for use in conjunction with the present invention.
Figure 20B:
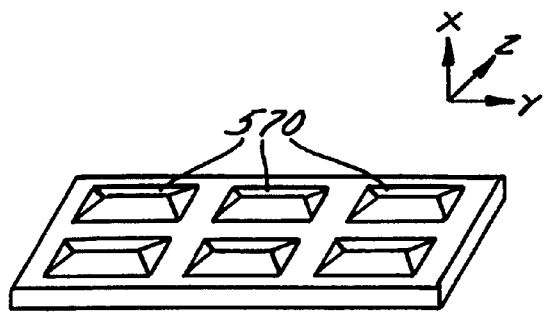
Figure 20C:
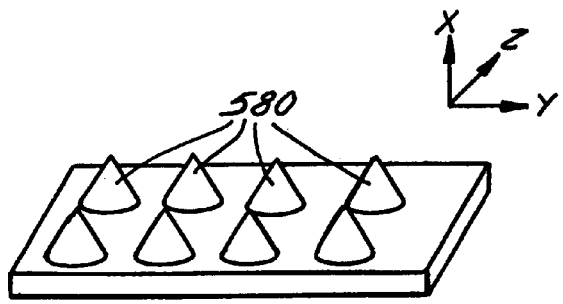

Referring now to FIG. 15, a liquid crystal display backlighting system can be based on a collimating waveguide 300 and a light bending and viewing film 400. The collimating waveguide 300 can function based on mirror reflection and/or total internal reflection. As in other embodiments, the collimating waveguide 300 is connected to a lamp 310 and a reflector 320 at a light input end 319. Light from the lamp 310 is conducted through an angular filtering film 330 to a nonimaging optic(s) (NIO) 340. The angular filtering film 330 includes a flat side 321 and a second side 322 having a plurality of parallel isometric triangular prisms, or a 2d array of prisms as shown in FIGS. 20A–20C. The function of the angular filtering film 330 is to collimate light are reject stray rays. As previously described, light rays travel the entire length of the N10 340 via total internal reflection to a far end 342. A reflective layer 344 reflects the light back through the N10 340.

Referring again to FIG. 15, NIO 340 can be a light pipe with rectilinear top and bottom surfaces, as shown, or a collimating waveguide with slanting top and bottom surfaces. The nonimaging optic 340 can be connected to, or formed integrally with, collimating waveguide 300. In alternative embodiments, the invention is preserved even if one or more of the reflector 320, the angular filtering film 330 and the NIO 340 are omitted, these elements being optional.

Still referring to FIG. 15, each of a first plurality of optical elements 350 formed at the bottom of the collimating waveguide 300 can have two planar facets, one planar facet and one curved facet, or two curved facets. In the depicted embodiment each of the first of the plurality of optical element has a first flat facet 351 and a second flat facet 352, the later of which is designed to function by total internal reflection (TIR). In a preferred embodiment, each of the first plurality of optical elements has a flat facet and a concave curved facet, the later of which is designed to function by total internal reflection (TIR). One, both or none of the facets of the plurality of optical elements 350 can be designed to function by total internal reflection, or alternatives including metallic reflection, absorption and/or transmission. In the depicted embodiment, the light rays 361–362 that are output from collimating waveguide 300 via second flat facet 352 are confined within a relatively narrow angular range that is non-normal to the top surface of collimating waveguide 300. However, the invention includes embodiments where the output angular range is normal to the top surface.

Referring now to FIG. 18B, an underlayer 360 can be located beneath the first plurality of optical elements 350. The underlayer 360 can be a separate flexible layer of reflective material such as, for example, Imperial Chemical Industries (ICI) Melinex #329-500. The underlayer 360 improves both the efficiency of brightness and the cosmetics of the system. The underlayer 360 can be completely opaque, substantially opaque or partially transmissive. In preferred embodiments, the underlayer 360 can be white, pearlescent or colored. The system can include an LCD (not shown) located above the illustrated subassembly. The function of the LCD is to provide a laptop computer, or other, display.

Referring again to FIG. 15, the light rays 361–362 that are output from the top of collimating waveguide 300 via TIR at second flat facet 352 are further refracted and reflected by a light bending and viewing film 400. Light bending and view film 400 includes a second plurality of optical elements 410. Each of the second plurality of optical elements 410 has a first flat facet 411 and a second flat facet 412, the later of which is designed to function by TIR. Each of the second plurality of optical elements 410 can have two flat facets, one flat facet and one curved facet, or two curved facets. In addition, two, one or none of the facets can be designed to function by TIR, or alternatives including metallic reflection, absorption and/or transmission. In a preferred embodiment, the second facet functions by TIR and is concave with respect to the first facet.

Still referring to FIG. 15, the light that is output from collimating waveguide 300 is refracted upon entry into the light bending and viewing film 400 after traveling between the top surface of collimating waveguide 300 and the first facet 411 of the second plurality of optical elements 410. The refracted light then undergoes TIR by the second facet 412 of the second plurality of optical elements 410. As noted earlier this reflection could be mirrored reflection due to, for example, a metalization layer, or absorption by a coating, or transmission, in addition to the depicted total internal reflection. In FIG. 15, the reflected light from second facet 412 then travels toward a surface diffuser 420. The surface diffuser 420 can be an integral part of film 400 or be a separate layer that is laminated, or otherwise, attached to film 400. The material in which the surface diffuser is replicated or molded can have the same index of refraction as the rest of film 400, even if it is not an integral part thereof. The light that is output from the light bending and viewing film 400 via surface diffuser 420 can be shaped into a relatively narrow angular range or dispersed into a relatively wide angular range. Similarly, the light that is output via surface diffuser 420 can be normal or non-normal to the top of light bending and viewing film 400. In the depicted embodiment of FIG. 15, the output light widely dispersed and non-normal to the average top surface of surface diffuser 420.

Figure 16A:
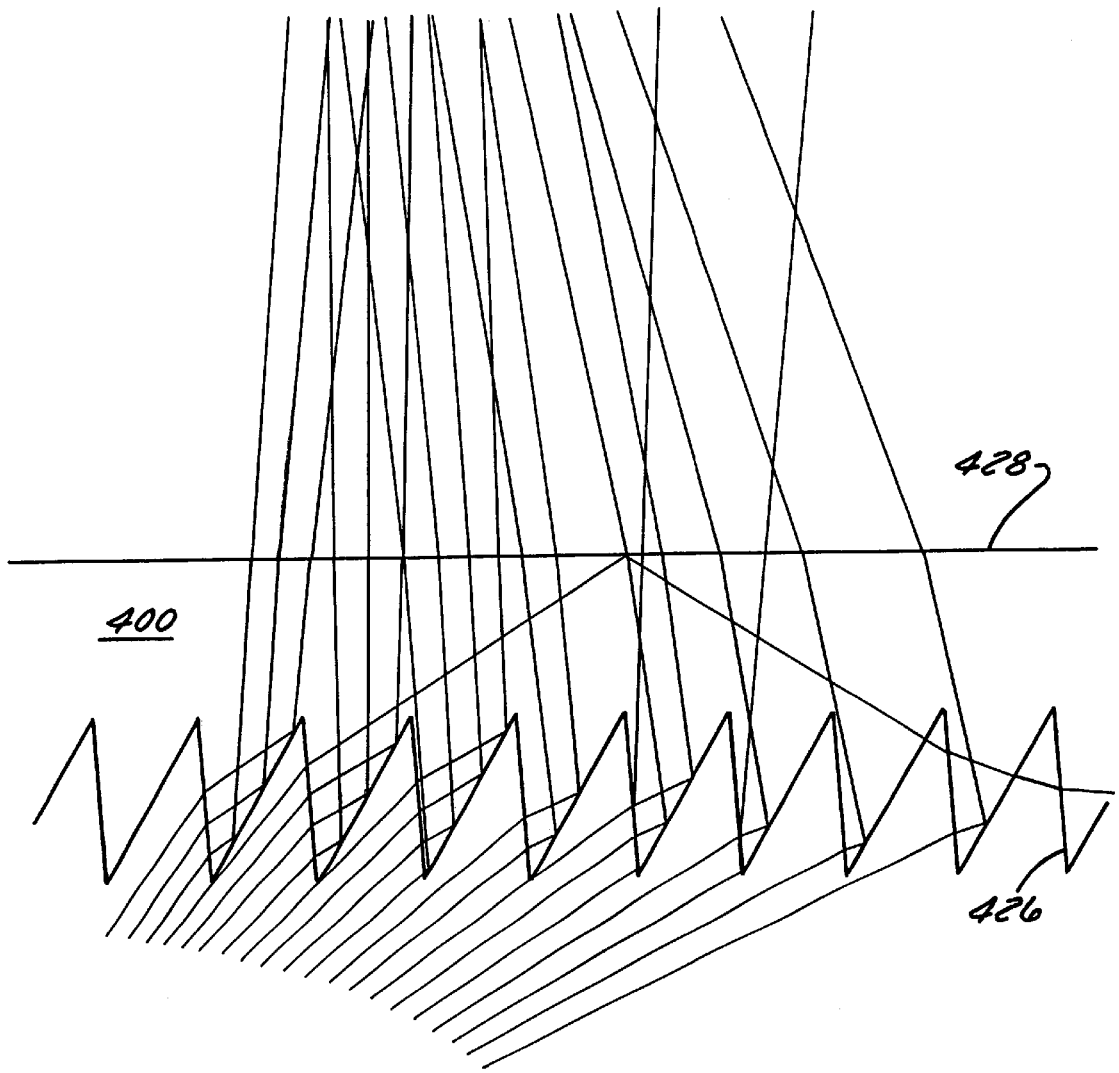
FIG. 16A illustrates a schematic cross sectional view of a portion of a directional turning film according to the present invention.

Referring now to FIG. 16A, the light bending and viewing film 400 can be a single layer of material that includes a lower topography 426 that defines the second plurality of optical elements and an upper topography 428 that defines the surface diffuser. Alternatively, light bending and viewing film 400 can be a two, or three, or even more, layer composite material. For example, the second plurality of optical elements can be replicated in a first layer of photopolymerizable material that is provided on one side of a polyester carrier web. Then the surface diffuser can be replicated in a second layer of photopolymerizable material that is proved on the other side of the polyester carrier web, thereby embedding the web between the two photopolymerized layers. Alternatively, the carrier web can be simultaneously provided with opposing photopolymerizable material layers that are simultaneously replicated and polymerized. As another alternative, instead of using a carrier web, one of the topographies can be compression molded to form a layer that acts as a carrier for a coating of photopolymerizable material into which the second topography is replicated. Furtherstill, both topographies of film 400 can be embossed onto a single layer of polycarbonate or other suitable material, or injection molded.

In FIG. 16A the ray tracings are shown for light that is being emitted from a localized source. More specifically, in FIG. 16A, a plurality of light rays are illustrated emanating from a virtual point source to depict an elementary response of film 400.

Figure 16B:
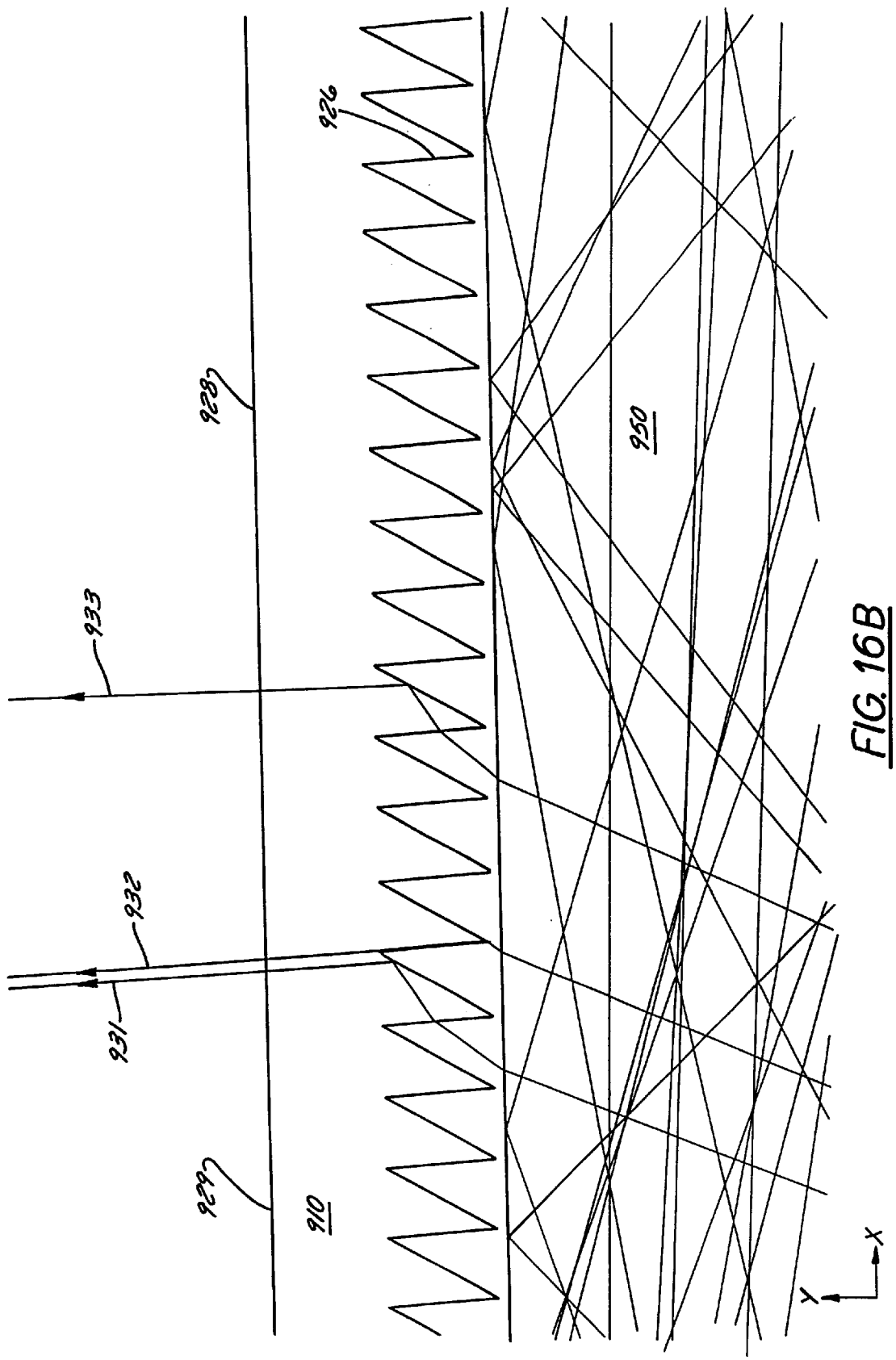
FIG. 16B illustrates a schematic cross sectional view of a portion of a directional turning film for use with a collimating waveguide according to the present invention.

Referring now to FIG. 16B, a light bending and turning film 910 includes a lower topography 926 that defines a plurality of optical elements and an upper topography 928 that defines a surface diffuser 929. A collimating waveguide 950 is located near the lower topography 926. It will be appreciated that many of the rays illustrated within waveguide 950 are being reflected by TIR and are not reaching the lower topography 926. Thus, the rays that do emerge are fairly well collimated. Further, referring to a series of rays 931, 932, and 933, it will also be appreciated that the film 910 functions to further collimate the light that enters the film 910 through the lower topography 926.

Figure 17A:
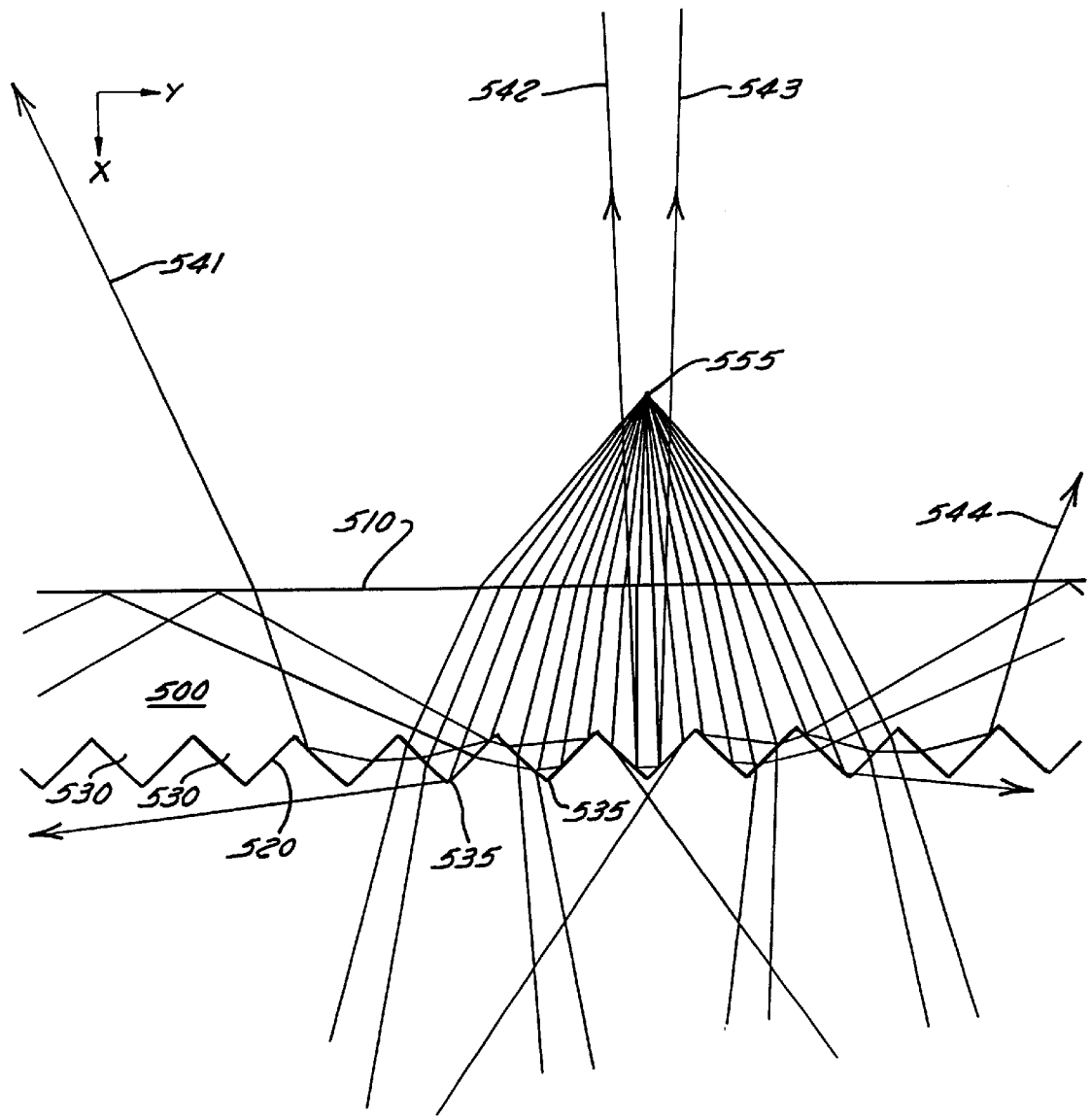
FIG. 17A illustrates a schematic cross sectional view of a portion of an angular filtering film for use adjacent a collimating waveguide according to the present invention.

Referring now to FIG. 17A, an angular filtering film 500, (e.g., BEF available from 3M of Minnesota, can be located adjacent the light engine inlet end of a collimating waveguide (not shown). It should be noted that film 500 cannot properly be termed a brightness enhancing film because such an effect is contrary to the second law of thermodynamics. The phrase angular filtering film is more precise. Angular filtering film 500 can include a flat side 510 and a second side 520 having a plurality of isometric triangular prisms 530. A portion of any incident light, represented by the downward pointing arrowhead 555, is collimated by film 500. It will be appreciated that film 500 acts as a collimating structure for some rays and simultaneously as a rejection filter for other rays, depending on incident position of these rays with regard to the triangular prism apexes 535. For example, rays 541, 542, 543, and 544 are being rejected by the film 500 are returned back toward the top of the figure.

Figure 17B:
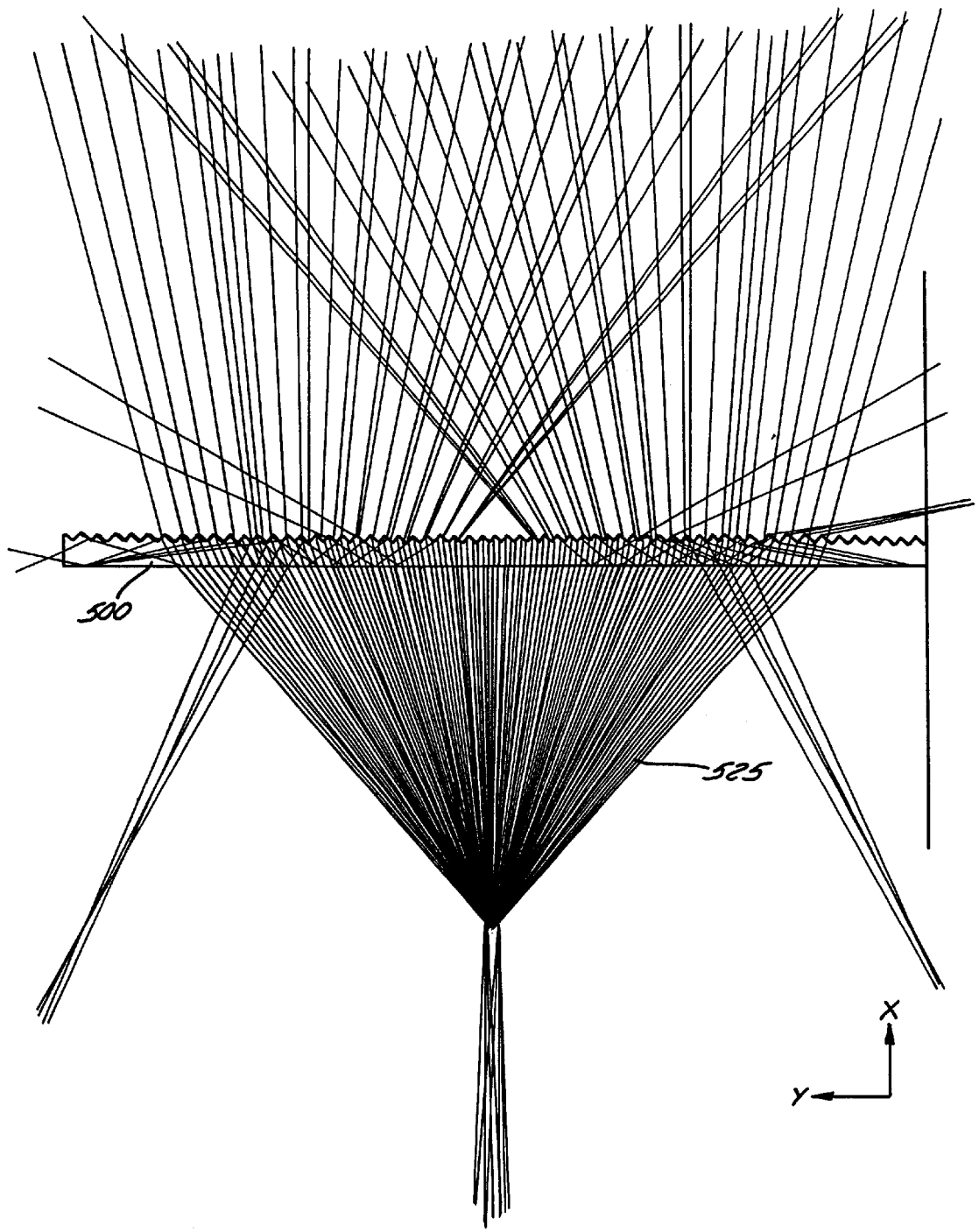
FIG. 17B illustrates a schematic cross sectional view of a portion of an angular filtering film for use adjacent a collimating waveguide according to the present invention.

Referring now to FIG. 17B, a larger number of rays interacting with a film 500 are shown. It will be appreciated that only a fraction of the incident rays 525 will be directed toward the LCD (not shown).

Referring now to FIGS. 20A, 20B, and 20C, three alternative angular filtering films that provide at least some degree of 3D filtering, in addition to the usual 2d filtering provided by such structures, are depicted. A planar array of pyramids 560 is shown in FIG. 20A. A planar array of extended pyramidal structures 570 is shown in FIG. 20B. A planar array of cones 580 is shown in FIG. 20C. All three of these embodiments provide some degree of angular filtering in the Z direction, as well as in the X and Y directions.

Figure 18:
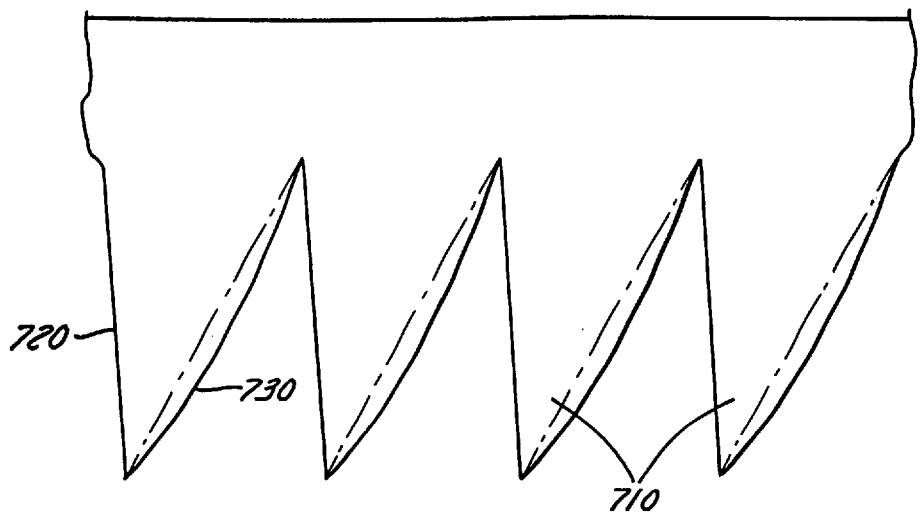
FIG. 18 illustrates a schematic cross sectional view of a portion of a directional turning film for use with a collimating waveguide according to the present invention.

Referring to FIG. 18, a light turning and viewing film 700 can include a plurality of optical elements 710, each of which has a flat facet 720 and a curved facet 730. The curved facets can be identical or optimized with regard to the flux that is expected to be reflected by that facet. In this embodiment, flat facet 720 is transparent and curved facet 730 functions by total internal reflection. However, while it is necessary for the first facet to be transparent, the second facet can be flat and/or metallized so as to operate by mirrored reflection.

Figure 19:
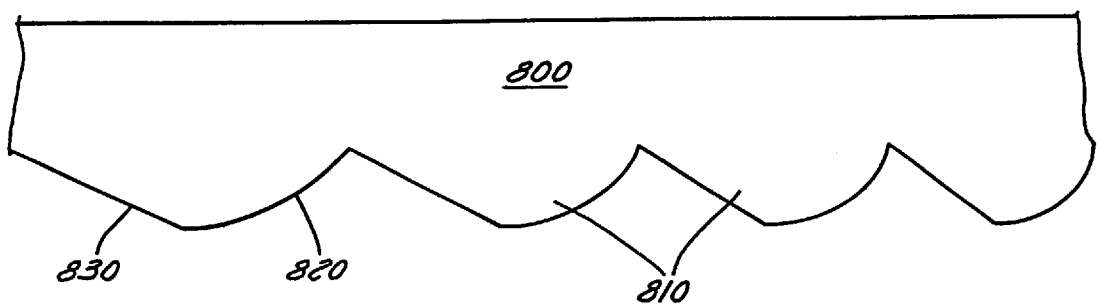
FIG. 19 illustrates a schematic cross sectional view of a portion of a curved facet collimating waveguide according to the present invention.

Referring to FIG. 19, a collimating waveguide 800 can include a plurality of optical elements 810, each of which has a curved facet 820 that is optimized with regard to the flux that is expected to be reflected by that facet. Each of the plurality of optical elements 810 also includes a flat facet 830. Curved facet 820 can function by total internal reflection or be provided with a reflective coating so as to function by mirrored reflection. These reflective facets can be flat or curved. The facets of the plurality of optical elements can be fabricated so as to use any combination of mirrored and/or total internal reflection surfaces as well as any combination of flat and/or curved surfaces. In the illustrated embodiment, the light source would be at the right end and the reflective far end would be at the left.

The curved facets become shorter as you move away from the reflective far end at the left of the drawing, (not shown). The upper vertex angle between the flat facets and the corresponding curved facets, as well as the curve shape are constant, but the flat facet angle increases as you move away from the reflecting far end. With regard to a plane defined by the apexes, the depth of the grooves decreases with distance away from the light source. This topography can be replicated using a master in which each of the plurality of optical elements is sequentially cut with a diamond tool that is incrementally rotated with regard to the previous element.

Preferred embodiments of the present invention can be identified one at a time by testing for the presence of collimated output. The test for the presence of collimated output can be carried out without undue experimentation by the use of simple and conventional polarization experiments. Among the other ways in which to seek embodiments having the attribute of collimated output, guidance toward the next preferred embodiment can be based on the presence of homogeneity.

The disclosed embodiments show a fluorescent bulb as the structure for performing the function of emitting light, but the structure for emitting light can be any other structure capable of performing the function of emitting light, including, by way of example an array of light emitting diodes (LEDs), or any other non-monochromatic light source, such as a strobe light. The illumination source can even be a monochromatic light source, albeit less commercially viable.

The disclosed embodiments show cylindrical and conical microlenses as the structures for performing the function of imaging collimation beyond the waveguide top surface but the structure for imaging collimation, however, can be any other structure capable of performing the function of changing the divergence light, including, by way of example a nonlinear optic such as a convection chamber.

The disclosed embodiments show a light shaping diffuser as the structure for performing the function of shaping light, but the structure for shaping light can be any other structure capable of performing the function of shaping light, including, by way of example, a lens such as a Fresnel lens.

A practical application of the present invention that has value within the technological arts is illuminating a liquid crystal display. Further, all the disclosed embodiments of the present invention are useful in conjunction with liquid crystal displays such as are used for the purpose of displaying data, or for the purpose of displaying an image, or the like. There are virtually innumerable uses for the present invention described herein, all of which need not be detailed here.

The present invention described herein provides substantially improved results that are unexpected in that a very good output is obtained with relatively low power with no diagonal line distortion. The present invention described herein can be practiced without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the compactness of the system could be enhanced by providing thinner illumination sources or thinner collimating waveguides. Similarly, although plastic is preferred for the collimating waveguide, any optically refractive material could be used in its place. In addition, the rest of the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which collimate light so as to provide backlighting. Further, although the liquid crystal display system described herein is a physically separate module, it will be manifest that the liquid crystal display may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. W. T. Welford and R. Winston, *Optics of Non-Imaging Concentrators,* Academic Press (1978).
2. R. Winston and T. Jannson, *Liouville Theorem and Concentrator Optics,* Journal of Optical Society of America, A, 3, 7 (1986) and A1, 1226 (1984).

What is claimed is:

1. A backlight apparatus comprising:
   a collimating waveguide having a light input end, a top surface, a bottom surface opposite the top surface, opposing sides, a far end opposite the light input end, and a total internal reflection critical angle;
   a plurality of first facets in the bottom surface distributed along the collimating waveguide between the light input end and the far end and extending at least part way between the opposing sides;
   each of the first facets having a first facet bottom surface converging toward the top surface in a direction away from the far end at an angle $\gamma$ relative to the top surface of less than about 10°;
   a light scattering and reflective surface disposed adjacent the far end of the collimating waveguide; and
   wherein the first facet bottom surfaces cause light rays entering the light input end to be totally internally reflected to the far end of the collimating waveguide, wherein the scattering and reflective surface at the far end reflects and scatters light rays incident thereon back toward the light input end, and wherein the first facet bottom surfaces cause light rays reflected from the far end to exit the top surface.

2. The backlight apparatus according to claim 1 wherein the first facet bottom surfaces cause light rays reflected from the far end at an angle near the total internal reflection critical angle to exit the top surface at an angle of about $2\gamma$ relative to the top surface.

3. The backlight apparatus according to claim 1 wherein the first facet bottom surfaces have a density $\rho$ distributed along the bottom surface of the collimating waveguide that varies as a function of a distance from the far end along the collimating waveguide.

4. The backlight apparatus according to claim 3 wherein the density $\rho$ increases as the distance from the far end increases.

5. The backlight apparatus according to claim 1 wherein each of the first facet bottom surfaces is a straight facet bottom surface.

6. The backlight apparatus according to claim 3 wherein each of the first facet bottom surfaces is a straight facet bottom surface, wherein the density $\rho$ of the straight first facet bottom surfaces increases as the distance from the far end increases, and wherein the angle $\gamma$ of each successive first straight facet bottom surface increases slightly in a direction away from the far end relative to each previous first straight facet bottom surface.

7. The backlight apparatus according to claim 6 wherein each straight first facet bottom surface is parallel to each other of the straight facet bottom surfaces.

8. The backlight apparatus according to claim 1 further comprising:
   a plurality of second facets in the bottom surface each having a second facet bottom surface, the plurality of second facets being distributed along the collimating waveguide between the light input end and the far end interleaved alternately between the plurality of first facets and extending at least part way between the opposing sides.

9. The backlight apparatus according to claim 8 wherein only each of the first facet bottom surfaces includes a reflective layer to prevent light leaking from each of the first facet bottom surfaces.

10. The backlight apparatus according to claim 9 wherein the reflective layer on each first facet bottom surface is a metallized reflective layer.

11. The backlight apparatus according to claim 1 wherein each of the first facets extends entirely across the backlight collimating waveguide between the opposing sides.

12. The backlight apparatus according to claim I wherein the plurality of first facets are distributed along the bottom surface so that light emitted from the top surface over a length of the collimating waveguide has a substantially uniform intensity.

13. The backlight apparatus according to claim 1, further comprising:
   a diffuser optically coupled to the top surface of the collimating waveguide for homogenizing light exiting the top surface.

14. The backlight apparatus according to claim 1, further comprising:
   a non-Lambertian diffuser optically coupled to the light input end of the collimating waveguide for reducing reflection from the light input end.

15. The backlight apparatus according to claim 1, further comprising:
   a spatial light modulator optically coupled to the collimating waveguide.

16. The backlight apparatus according to claim 1, further comprising:
   a light source optically coupled to the light input end of the collimating waveguide.

17. The backlight apparatus according to claim 1, further comprising:
   a liquid crystal display optically coupled to the top surface of the collimating waveguide.

18. A liquid crystal display apparatus comprising:
   a liquid crystal element having a front viewing surface and an opposite rear surface;
   a collimating waveguide having a light input end, a top surface facing the rear surface of the liquid crystal display, a bottom surface opposite the top surface, opposing sides, a far end opposite the light input end, and a total internal reflection critical angle;
   a light source disposed adjacent the light input end;
   a plurality of first facets in the bottom surface distributed along the collimating waveguide between the light input end and the far end and extending at least part way between the opposing sides;
   each of the first facets having a first facet bottom surface converging toward the top surface in a direction away from the far end at an angle γ relative to the top surface of less than about 10°;
   a light scattering and reflective surface disposed at the far end of the collimating waveguide; and
   wherein the first facet bottom surfaces cause light rays entering the light input end to be totally internally reflected to the far end of the collimating waveguide, wherein the scattering and reflective surface at the far end reflects and scatters light rays incident thereon back toward the light input end, and wherein the first facet bottom surfaces cause light rays reflected from the far end to exit the top surface toward the liquid crystal element.

19. The liquid crystal display according to claim 18, further comprising:
   a non-Lambertian first diffuser optically coupled to the liquid crystal element for directing light rays exiting the liquid crystal display;
   a second diffuser optically coupled to the top surface of the collimating waveguide for homogenizing light rays exiting the top surface; and
   a non-Lambertian third diffuser optically coupled to the light input end of the collimating waveguide for reducing reflection from the light input end.

20. The liquid crystal display according to claim 18, further comprising:
   a spatial light modulator optically coupled to the collimating waveguide.

21. The liquid crystal display according to claim 18, further comprising:
   a plurality of second facets in the bottom surface each having a second facet bottom surface, the plurality of second facets being distributed along the collimating waveguide between the light input end and the far end interleaved alternately between the plurality of first facets and extending at least part way between the opposing sides, wherein the first facet bottom surfaces and the second facet bottom surfaces cause light rays entering the light input end to be totally internally reflected to the far end of the collimating waveguide whereby the scattering and reflective surface at the far end reflects and scatters light rays incident thereon back toward the light input end, and wherein the first facet bottom surfaces cause light rays reflected from the far end to exit the top surface at an angle nearly tangential to the top surface.

22. A backlight apparatus comprising:
   a collimating waveguide having a light input end, a top surface, a bottom surface opposite the top surface, opposing sides, a far end opposite the light input end, and a total internal reflection critical angle;
   a plurality of first facets in the bottom surface distributed along the collimating waveguide between the light input end and the far end and extending at least part way between the opposing sides;
   each of the first facets having a curved first facet bottom surface converging toward the top surface in a direction away from the far end;
   a plurality of second facets in the bottom surface each having a second facet bottom surface, the plurality of second facets being distributed along the collimating waveguide between the light input end and the far end interleaved alternately between the plurality of first facets and extending at least part way between the opposing sides;

a light scattering and reflective surface disposed adjacent the far end of the collimating waveguide; and wherein the first facet and second facet bottom surfaces cause light rays entering the light input end to be totally internally reflected to the far end of the collimating waveguide whereby the scattering and reflective surface at the far end reflects and scatters light rays incident thereon back toward the light input end, and wherein the curved first facet bottom surfaces are arranged to reflect a light ray bundle incident to the curved first facet bottom surface and reflected from the far end to exit the top surface at an angle nearly normal to the top surface.

23. A backlight apparatus comprising:

a collimating waveguide having a light input end, a top surface, a bottom surface opposite the top surface, opposing sides, a far end opposite the light input end, and a total internal reflection critical angle;

a plurality of first facets in the bottom surface distributed along the collimating waveguide between the light input end and the far end and extending at least part way between the opposing sides, wherein each of the first facets has a first facet bottom surface converging toward the top surface in a direction away from the far end; and a light scattering and reflective surface disposed adjacent the far end of the collimating waveguide;

wherein the first facet bottom surfaces cause light rays entering the light input end to be totally internally reflected to the far end of the collimating waveguide, wherein the scattering and reflective surface at the far end reflects and scatters light rays incident thereon back toward the light input end, and wherein the first facet bottom surfaces cause light rays reflected from the far end to exit the top surface.

24. The backlight apparatus according to claim 23, wherein the first facet bottom surfaces have a density value distributed along the bottom surface of the collimating waveguide that varies as a function of a distance from the far end along the collimating waveguide.

25. The backlight apparatus according to claim 24, wherein the density value increases as the distance from the far end increases.

26. The backlight apparatus according to claim 23, wherein each of the first facet bottom surfaces is a straight facet bottom surface.

27. The backlight apparatus according to claim 24, wherein each of the first facet bottom surfaces is a straight facet bottom surface, and wherein the density value of the straight first facet bottom surfaces increases as the distance from the far end increases.

28. The backlight apparatus according to claim 27, wherein each straight first facet bottom surface is parallel to each other of the straight facet bottom surfaces.

29. The backlight apparatus according to claim 23, further comprising:

a plurality of second facets in the bottom surface, wherein each second facet has a second facet bottom surface, wherein the plurality of second facets are distributed along the collimating waveguide between the light input end and the far end interleaved alternately between the plurality of first facets and extending at least part way between the opposing sides.

30. The backlight apparatus according to claim 29, wherein only each of the first facet bottom surfaces includes a reflective layer to prevent light leaking from each of the first facet bottom surfaces.

31. The backlight apparatus according to claim 30, wherein the reflective layer on each first facet bottom surface is a metallized reflective layer.

32. The backlight apparatus according to claim 23, wherein each of the first facets extends entirely across the backlight collimating waveguide between the opposing sides.

33. The backlight apparatus according to claim 23, wherein the plurality of first facets are distributed along the bottom surface so that light emitted from the top surface over a length of the collimating waveguide has a substantially uniform intensity.

34. The backlight apparatus according to claim 23, further comprising:

a diffuser optically coupled to the top surface of the collimating waveguide for homogenizing light exiting the top surface.

35. The backlight apparatus according to claim 23, further comprising:

a non-Lambertian diffuser optically coupled to the light input end of the collimating waveguide for reducing reflection from the light input end.

36. The backlight apparatus according to claim 23, further comprising:

a spatial light modulator optically coupled to the collimating waveguide.

37. The backlight apparatus according to claim 23, further comprising:

a light source optically coupled to the light input end of the collimating waveguide.

38. The backlight apparatus according to claim 23, further comprising:

a liquid crystal display optically coupled to the top surface of the collimating waveguide.

39. A liquid crystal display apparatus comprising:

a liquid crystal element have a front viewing surface and an opposite rear surface;

a collimating waveguide having a light input end, a top surface facing the rear surface of the liquid crystal display, a bottom surface opposite the top surface, opposing sides, a far end opposite the light input end, and a total internal reflection critical angle;

a light source disposed adjacent the light input end;

a plurality of first facets in the bottom surface distributed along the collimating waveguide between the light input end and the far end and extending at least part way between the opposing sides, wherein each of the first facets has a first facet bottom surface converging toward the top surface in a direction away from the far end; and a light scattering and reflective surface disposed at the far end of the collimating waveguide;

wherein the first facet bottom surfaces cause light rays entering the light input end to be totally internally reflected to the far end of the collimating waveguide, wherein the scattering and reflective surface at the far end reflects and scatters light rays incident thereon back toward the light input end, and wherein the first facet bottom surfaces cause light rays reflected from the far end to exit the top surface toward the liquid crystal element.

40. The liquid crystal display according to claim 39, further comprising:

a non-Lambertian first diffuser optically coupled to the liquid crystal element for directing light rays exiting the liquid crystal display;

a second diffuser optically coupled to the top surface of the collimating waveguide for homogenizing light rays exiting the top surface; and a non-Lambertian third diffuser optically coupled to the light input end of the collimating waveguide for reducing reflection from the light input end.

41. The liquid crystal display according to claim 39, further comprising:

a spatial light modulator optically coupled to the collimating waveguide.

42. The liquid crystal display according to claim 39, further comprising:

a plurality of second facets in the bottom surface, wherein each second facet has a second facet bottom surface, wherein the plurality of second facets are distributed along the collimating waveguide between the light input end and the far end interleaved alternately between the plurality of first facets and extending at least part way between the opposing sides, wherein the first facet bottom surfaces and the second facet bottom surfaces cause light rays entering the light input end to be totally internally reflected to the far end of the collimating waveguide, wherein the scattering and reflective surface at the far end reflects and scatters light rays incident thereon back toward the light input end, and wherein the first facet bottom surfaces cause light rays reflected from the far end to exit the top surface at an angle nearly tangential to the top surface.

* * * * *